(12) United States Patent
Cho et al.

(10) Patent No.: US 9,805,242 B2
(45) Date of Patent: Oct. 31, 2017

(54) ELECTRONIC DEVICE WITH TOUCH SENSOR AND DRIVING METHOD THEREFOR

(71) Applicant: Samsung Electronics Co., Ltd., Gyeonggi-do (KR)

(72) Inventors: Jeong-Ho Cho, Gyeonggi-do (KR); Jeong-Min Park, Gyeonggi-do (KR); Dong-Hwan Bae, Gyeonggi-do (KR); Seung-Geol Baek, Gyeonggi-do (KR); Jung-Won Suh, Gyeonggi-do (KR); Cheol-Jun Lee, Gyeonggi-do (KR); Do-Hyoung Chung, Seoul (KR); Kyong-Gon Choi, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 15/016,652

(22) Filed: Feb. 5, 2016

(65) Prior Publication Data
US 2017/0024597 A1    Jan. 26, 2017

(30) Foreign Application Priority Data
Feb. 5, 2015    (KR) .................. 10-2015-0017963

(51) Int. Cl.
*G06K 9/62* (2006.01)
*G06K 9/00* (2006.01)
(Continued)

(52) U.S. Cl.
CPC .......... *G06K 9/0002* (2013.01); *G06F 3/041* (2013.01); *G06F 3/04883* (2013.01);
(Continued)

(58) Field of Classification Search
CPC ...................... G06K 9/00013–9/00053; G06F 3/0488–3/04886; G06F 2203/04106
See application file for complete search history.

(56) References Cited

U.S. PATENT DOCUMENTS

| RE42,038 E | 1/2011 | Abdallah et al. |
|---|---|---|
| 2010/0240415 A1 | 9/2010 | Kim et al. |

(Continued)

FOREIGN PATENT DOCUMENTS

| EP | 0 593 386 | 4/1994 |
|---|---|---|
| GB | 2490593 | 11/2012 |

OTHER PUBLICATIONS

European Search Report dated Jun. 13, 2016 issued in counterpart application No. 16154278.2-1901, 7 pages.

*Primary Examiner* — Brian P Werner
(74) *Attorney, Agent, or Firm* — The Farrell Law Firm, P.C.

(57) ABSTRACT

An electronic device having a fingerprint verification function is provided. The electronic device includes a display; a touch recognition sensor pattern for recognizing a touch input on the display; a fingerprint recognition sensor pattern for recognizing a fingerprint input on the display; and a processor functionally connected to the display, the touch recognition sensor pattern and the fingerprint recognition sensor pattern. The processor determines whether a fingerprint recognition mode is executed, and selectively activates the touch recognition sensor pattern and the fingerprint recognition sensor pattern according to whether the determined fingerprint recognition mode is executed.

20 Claims, 43 Drawing Sheets

(51) Int. Cl.
*G06F 21/32* (2013.01)
*G06F 3/041* (2006.01)
*G06F 3/0488* (2013.01)
*G09G 3/3208* (2016.01)
*G09G 3/36* (2006.01)

(52) U.S. Cl.
CPC ........... *G06F 21/32* (2013.01); *G06K 9/0008* (2013.01); *G06K 9/00087* (2013.01); *G09G 3/3208* (2013.01); *G09G 3/36* (2013.01); *G06F 2203/04106* (2013.01); *G06F 2203/04112* (2013.01); *G09G 2330/021* (2013.01)

(56) References Cited

U.S. PATENT DOCUMENTS

| | | |
|---|---|---|
| 2011/0176037 A1 | 7/2011 | Benkley, III |
| 2013/0135247 A1 | 5/2013 | Na et al. |
| 2014/0047706 A1 | 2/2014 | Shaikh et al. |
| 2014/0341446 A1* | 11/2014 | Hare ................. G06F 3/0416 382/124 |
| 2014/0359756 A1* | 12/2014 | Alameh ............... G06F 21/32 726/19 |
| 2015/0358314 A1* | 12/2015 | Glik .................. H04L 63/0861 726/7 |
| 2016/0148037 A1* | 5/2016 | Baek .................. G06K 9/0002 345/174 |

* cited by examiner

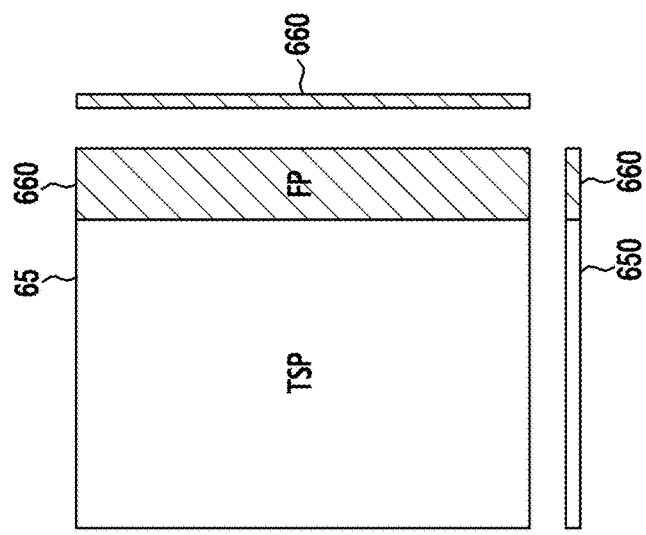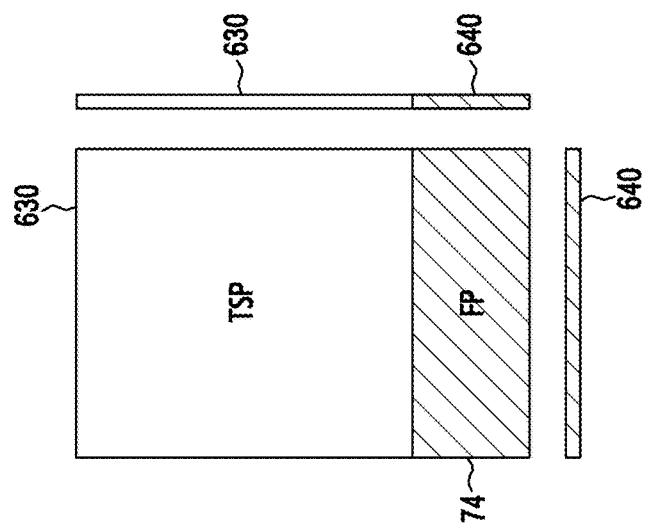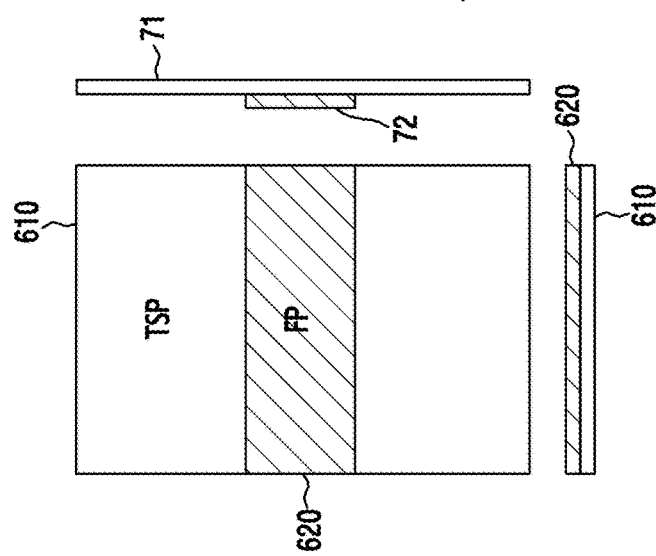

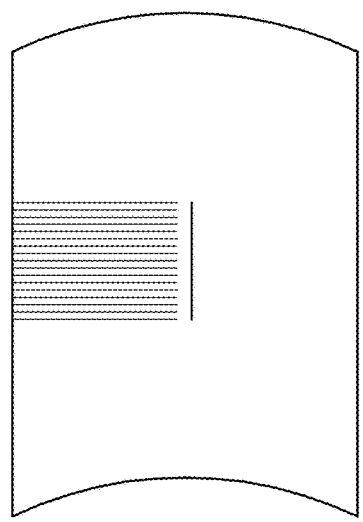
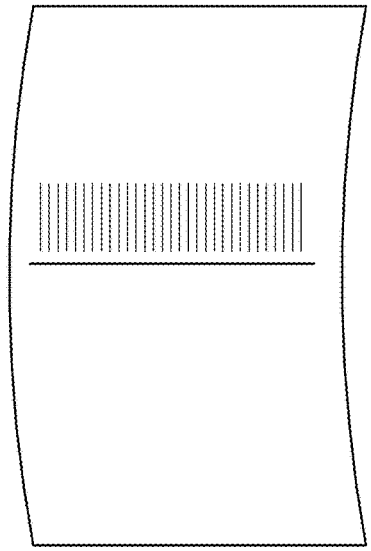
IN CASE IN WHICH LCD IS CURVED IN X AXIS
IN CASE IN WHICH LCD IS CURVED IN Y AXIS
FIG.17A
FIG.17B
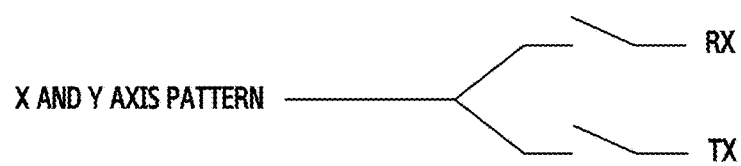
FIG.17C

ELECTRONIC DEVICE WITH TOUCH SENSOR AND DRIVING METHOD THEREFOR

PRIORITY

This application claims priority under 35 U.S.C. §119(a) to Korean Patent Application Serial No. 10-2015-0017963, which was filed in the Korean Intellectual Property Office on Feb. 5, 2015, the entire content of which is incorporated herein by reference.

BACKGROUND

1. Field of the Disclosure

The present disclosure relates generally to an electronic device including a touch sensor including a fingerprint recognition (or fingerprint verification) in the electronic device and a method of driving the touch sensor.

2. Description of the Related Art

As use of electronic devices such as a smart phone, a tablet PC, and a wearable device is generalized, a concern about security and the usability of the electronic device increases. In fact, the security and the usability has a trade-off relationship, and thus it is normal that the usability is reduced while the security is increased. However, if a two-dimensional (2D) fingerprint sensor is installed together with a display in an electronic device, a usability of fingerprint recognition, which already provides high security, may be improved innovatively. A user experience of a normal touch using a touch screen panel (TSP) and that of a touch for a fingerprint recognition are organically connected with each other, and thus the security and the usability may be simultaneously ensured.

As described above, the 2D fingerprint sensor capable of recognizing the fingerprint in the display is an innovative technology, but there are many technical considerations in implementing the 2D fingerprint sensor. The most prominent are a fingerprint recognition rate and a large current consumption.

The fingerprint sensor installed in the electronic device recognizes a shape of the fingerprint in a swipe method or a touch method, and compares the recognized fingerprint with previously generated fingerprint data to authenticate the fingerprint. In order to recognize the shape of the fingerprint, valleys and ridges of the fingerprint should be determined. In the determination of the valleys and the ridges, various methods are used, and optical, ultrasonic, capacitance methods, and the like are used.

Among these, the capacitance method is frequently used in an electronic device such as a smart phone and a tablet PC. A sensor for a fingerprint recognition in the capacitance method includes a transmitter electrode (line) (Tx) and an receiver electrode (line) (Rx). Specially, the Rx is formed in a dense interval for the fingerprint recognition. When a user touches a fingerprint sensor formed of the Tx and Rx, a charge is transmitted from the Tx to the Rx, and a value of the capacitance received by the Rx is changed according to a distance between a finger and the Tx. Since this value is inversely proportional to a distance, the valleys and the ridges of the fingerprint may be generated based on this.

The fingerprint sensor using the capacitance may be defined as a one-dimensional (1D) or 2D fingerprint sensor according to a method of forming the Tx and the Rx. The 1D fingerprint sensor is commonly referred to as a shape of sweeping a finger, that is a swipe method, and the 2D fingerprint sensor is referred to as a shape of pushing the finger, that is a touch method.

The fingerprint sensor may be vertically combined with a touch screen, or may be formed in parallel with the touch screen. Therefore, an operation and a recognition of the fingerprint sensor may be simultaneously performed while operating a touch screen.

However, in the conventional design of a fingerprint sensor combined with a TSP which is an input means of the touch screen, there may be the following problems.

First, a cost increase resulting from an increase to a screen size may occur. The fingerprint sensor should accurately scan a shape of the fingerprint of a finger differently from a capacitance type touch screen. For example, the fingerprint sensor may have Tx and Rx distances of 50 μm. Tx and Rx distance formations of a considerably dense interval-type are necessary in this process.

A screen of an electronic device such as a smart phone has a tendency to be large, and thus when a fingerprint sensor corresponding to the size of the screen is included in the electronic device, a cost is naturally increased according to the size of the screen. However, although the screen of a tablet PC may be larger than a screen of a smart phone, the Tx and Rx distances of the fingerprint sensor should be the same as those of the smart phone.

Next, a confusion between a touch of the touch screen and a touch of the fingerprint sensor may occur. When the fingerprint sensor is installed in the uppermost side, the lowermost side, the leftmost side, and the most rightmost side of an electronic device screen, a conflict related to a user experience (UX) may be generated between a normal touch operation and a fingerprint recognition operation. For example, when a fingerprint input is allowed in an upper side notification panel area and a button input area of a lower side, the fingerprint recognition operation may conflict with the touch operation. In addition, in a case of a multi-touch operation, a UX between the normal touch operation and the fingerprint touch operation may become complex.

Accordingly, there is a need to distinguish between a touch input and a fingerprint input. Thus, a separate fingerprint input mode may need to be provided. When a separate fingerprint input mode is provided, a partial fingerprint input may be possible without a need to enable a fingerprint input in a whole screen.

Additionally, a difficulty of the fingerprint recognition in a curved screen of the electronic device may occur. The fingerprint recognition is not uniform in the curved screen, and thus the fingerprint recognition in the touch operation may be difficult.

Finally, a large current consumed in the case of the fingerprint recognition may occur. In the case of the fingerprint recognition, both the TSP and the fingerprint sensor must be operated. When the fingerprint sensor is formed of the Tx and the Rx in a whole screen, all Tx and Rx should be turned on for a partial recognition since it is not known where to recognize the fingerprint.

Accordingly, a new structure for a fingerprint sensor installed in a portable electronic device having a TSP, such as a smart phone, a tablet PC, and a wearable device (or wearable apparatus) is needed.

SUMMARY

The present disclosure has been made to address at least the problems and disadvantages described above, and to provide at least the advantages described below.

Accordingly, an aspect of the present disclosure is to provide a sensor which maximizes a usability of the fingerprint recognition on a touch screen panel (TSP) in a portable electronic device and a method of driving the same, beyond a simple physical combination of the TSP and the fingerprint sensor.

Accordingly, another aspect of the present disclosure is to provide a uniformly sized fingerprint sensor, having a fixed input size to allow for use in devices having a screen of various sizes, without negatively affecting usability.

Accordingly, another aspect of the present disclosure is to reduce material cost and a manufacturing cost of an installed fingerprint sensor due to a uniformity of the sensor size.

Accordingly, another aspect of the present disclosure is to provide a method for performing fingerprint recognition of an electronic device, allowing for a more natural and comfortable use of the electronic device Accordingly, another aspect of the present disclosure is to provide a customized method of fingerprint recognition such that a left hand, a right hand, and/or a specific finger, may be identified and registered by a user of the electronic device for fingerprint recognition.

Accordingly, another aspect of the present disclosure is to provide a method of fingerprint recognition using a flat TSP, a TSP having a predetermined curvature, and a curved TSP.

Accordingly, another aspect of the present disclosure is to change the method of fingerprint recognition to touch or swipe according to the type of the screen of the electronic device.

Accordingly, another aspect of the present disclosure is to operate a TSP and a fingerprint sensor together, based on mutual information between the TSP and the fingerprint sensor, and thus prevent a degradation of the usability or performance, due to mutual interference of the TSP and the fingerprint sensor.

Accordingly, another aspect of the present disclosure is to selectively drive the Tx and Rx of a fingerprint sensor to reduce current consumption in the electronic device According to an aspect of the present disclosure, an electronic device having a fingerprint verification function, is provided. The electronic device includes a display; a touch recognition sensor pattern for recognizing a touch input on the display; a fingerprint recognition sensor pattern for recognizing a fingerprint input on the display; and a processor functionally connected to the display, the touch recognition sensor pattern and the fingerprint recognition sensor pattern. The processor determines whether a fingerprint recognition mode is executed, and selectively activates the touch recognition sensor pattern and the fingerprint recognition sensor pattern according to whether the determined fingerprint recognition mode is executed.

According to an aspect of the present disclosure, a method of driving an electronic device including a display, a touch recognition sensor pattern, and a fingerprint recognition sensor pattern is provided. The method includes receiving an input on the display, determining whether a fingerprint recognition is executed based on the input, and selectively activating the touch recognition sensor pattern and the fingerprint recognition sensor pattern according to whether the fingerprint recognition is executed.

BRIEF DESCRIPTION OF THE DRAWINGS

The above and other aspects, features, and advantages of the present disclosure will be more apparent from the following detailed description taken in conjunction with the accompanying drawings, in which:

FIGS. 6A to 6C are views illustrating examples in which an FP is disposed at a TSP, according to an embodiment of the present disclosure;

FIGS. 17A to 17C illustrate a recognition direction for a fingerprint recognition on a curved display, according to an embodiment of the present disclosure;

DETAILED DESCRIPTION OF EMBODIMENTS OF THE PRESENT DISCLOSURE

Figure 1:
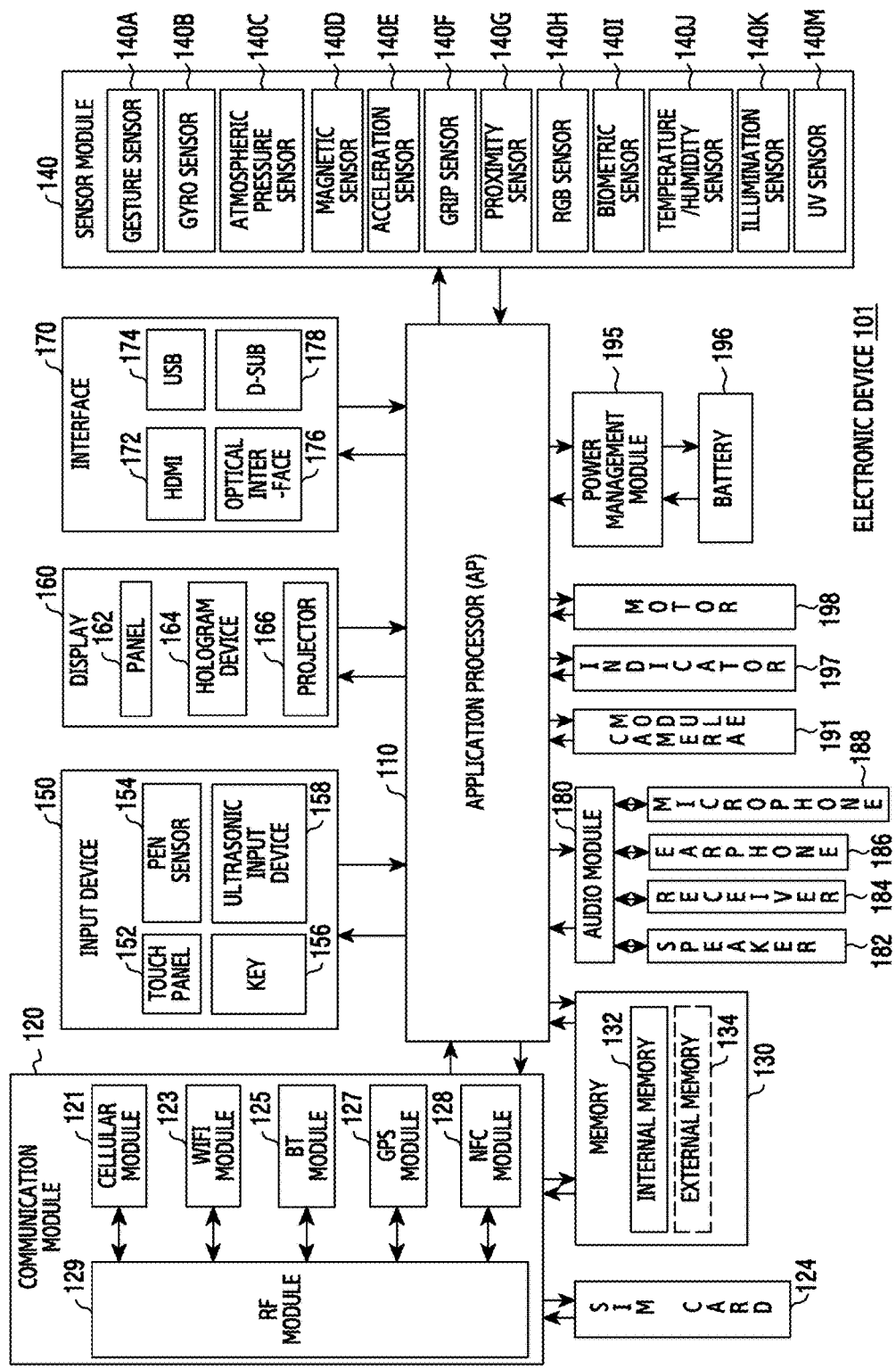
FIG. 1 is a block diagram of an electronic device, according to an embodiment of the present disclosure.

Hereinafter, various embodiments of the present disclosure will be explained with reference to the accompanying drawings. Although specific embodiments of the present disclosure are illustrated in the drawings and relevant detailed descriptions are provided, various changes can be made and various embodiments may be provided. Accordingly, various embodiments of the present disclosure are not limited to the specific embodiments and should be construed as including all changes and/or equivalents or substitutes included in the ideas and technological scopes of embodiments of the present disclosure. In the explanation of the drawings, similar reference numerals are used for similar elements.

The terms "include" and "may include", as used herein, indicate the presence of disclosed corresponding functions, operations, elements, and the like, and do not limit additional functions, operations, elements, and the like. In addition, it should be understood that the terms "include" and "have", as used herein, are to indicate the presence of features, numbers, steps, operations, elements, parts, or a combination thereof described in the specifications, and do not preclude the presence or addition of one or more other features, numbers, steps, operations, elements, parts, or a combination thereof.

The term "or", as used herein, includes any and all combinations of words enumerated with it For example, "A or B" means including A, including B, or including both A and B.

Although the terms, such as "first" and "second" used in the various embodiments of the present disclosure may modify various elements of the various embodiments, these terms do not limit the corresponding elements. For example, these terms do not limit an order and/or importance of the corresponding elements. These terms may be used for the purpose of distinguishing one element from another element. For example, a first electronic device and a second electronic device both indicate electronic devices and may indicate different electronic devices. For example, a first element may be referred to as a second element without departing from the scope of right of the various embodiments of the present disclosure, and similarly, a second element may be referred to as a first element.

When an element is mentioned as being "connected" or "coupled" to another element, the element may be directly connected or coupled to another element, and there may be an intervening element between the first element and the second element. When an element is mentioned as being "directly connected" or "directly coupled" to another element, there is no intervening element between the element and another element.

The terms used herein are for the purpose of describing specific embodiments only and are not intended to limit various embodiments of the present disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same meanings as the contextual meanings of the relevant technology and should not be interpreted as having ideal or exaggerated meanings unless they are clearly defined herein.

An electronic device, according to various embodiments of the present disclosure may be a device that is equipped with a communication function. For example, the electronic device may include at least one of a smartphone, a tablet personal computer (PC), a mobile phone, a video phone, an electronic book reader, a desktop PC, a laptop PC, a netbook computer, a personal digital assistant (PDA), a portable multimedia player (PMP), an MP3 player, a mobile medical machine, a camera, or a wearable device (for example, a head-mounted-device (HMD), such as electronic glasses, electronic clothing, an electronic bracelet, an electronic necklace, an electronic appcessory, electronic tattoos, or a smart watch).

The electronic device, according to various embodiments of the present disclosure, may be one or a combination of one or more of the above-mentioned devices. In addition, the electronic device, according to various embodiments of the present disclosure, may be a flexible device. The electronic device according to the various embodiments of the present disclosure is not limited to the above-mentioned devices.

Hereinafter, an electronic device according to various embodiments will be explained with reference to the accompanying drawings. The term "user", as used herein, may refer to a person who uses the electronic device or a device that uses the electronic device (for example, an artificial intelligence electronic device).

FIG. 1 is a block diagram of an electronic device, according to an embodiment of the present disclosure.

Referring to FIG. 1, a electronic device 101 is provided. The electronic device 101 includes one or more Application Processors (APs) 110, a communication module 120, a Subscriber Identification Module (SIM) card 124, a memory 130, a sensor module 140, an input device 150, a display 160, an interface 170, an audio module 180, a camera module 191, a power management module 195, a battery 196, an indicator 197, or a motor 198.

The AP 110 controls a plurality of hardware or software elements connected to the AP 110 by driving an operating system or an application program, and processes and calculates a variety of data including multimedia data. For example, the AP 110 may be implemented by using a System on Chip (SoC). The AP 110 may further include a Graphic Processing Unit (GPU).

The communication module 120 may transmit and receive data via communication between the electronic device 101 and other electronic devices connected through a network. The communication module 120 includes a cellular module 121, a WiFi module 123, a BT module 125, a GPS module 127, an NFC module 128, and a Radio Frequency (RF) module 129.

The cellular module 121 provides a voice call, a video call, a text service, or an internet service through a telecommunications network (for example, LTE, LTE-A, CDMA, WCDMA, UMTS, WiBro, GSM, and the like). In addition, the cellular module 121 identifies and authenticates the electronic device in the telecommunications network by using a subscriber identification module. The cellular module 121 performs at least some of the functions provided by the AP 110. For example, the cellular module 121 performs at least some of the multimedia control functions.

The cellular module 121 may include a Communication Processor (CP). In addition, the cellular module 121 may be implemented by using a SoC, for example. In FIG. 1, the cellular module 121 (for example, the communication processor), the memory 130, and the power management module 195 are elements separate from the AP 110. However, the AP 110 may be configured to include at least some of the above-described elements.

According to an embodiment, the AP 110 or the cellular module 121 (for example, the communication processor) loads instructions or data received from a non-volatile memory connected therewith or at least one of the other elements into a volatile memory, and processes the instructions or data. In addition, the AP 110 or the cellular module 121 stores data which is received from at least one of the other elements or generated by at least one of the other elements in the non-volatile memory.

The WiFi module 123, the BT module 125, the GPS module 127, or the NFC module 128 each may include a processor for processing data received and transmitted through a corresponding module. In FIG. 1, the cellular module 121, the WiFi module 123, the BT module 125, the GPS module 127, or the NFC module 128 are illustrated in a separate block. However, at least some of the cellular module 121, the WiFi module 123, the BT module 125, the GPS module 127, or the NFC module 128 may be included in a single integrated chip (IC) or a single IC package. For example, at least some of the processors corresponding to the cellular module 121, the WiFi module 123, the BT module 125, the GPS module 127, and the NFC module 128 (for example, the communication processor corresponding to the cellular module 121 and the WiFi processor corresponding to the WiFi module 123) may be implemented by using a single SoC.

The RF module 129 transmits and receives data, for example, transmits and receives an RF signal. The RF module 129 may include a transceiver, a Power Amp Module (PAM), a frequency filter, or a Low Noise Amplifier (LNA). In addition, the RF module 129 may further include a part for exchanging electromagnetic waves in a free space in wireless communication, for example, a conductor or conducting wire. In FIG. 1, the cellular module 121, the WiFi module 123, the BT module 125, the GPS module 127, and the NFC module 128 share the single RF module 129 with one another. However, at least one of the cellular module 121, the WiFi module 123, the BT module 125, the GPS module 127, or the NFC module 128 transmits and receives an RF signal through a separate RF module.

The SIM card 124 includes a subscriber identification module to be inserted into a slot formed on a specific location of the electronic device 101. The SIM card 124 may include unique identification information (for example, an Integrated Circuit Card Identifier (ICCID)) or subscriber information (for example, International Mobile Subscriber Identity (IMSI)).

The memory 130 includes an internal memory 132 or an external memory 134. For example, the internal memory 132 includes at least one of a volatile memory (for example, a Dynamic Random Access Memory (DRAM), a Static Random Access Memory (SRAM), a Synchronous DRAM (SDRAM), and the like) and a non-volatile memory (for example, an One-Time Programmable Read Only Memory (OTPROM), a Programmable Read Only Memory (PROM), an Erasable Programmable Read Only Memory (EPROM), an Electrically Erasable Programmable Read Only Memory (EEPROM), a mask ROM, a flash ROM, a NAND flash memory, a NOR flash memory, and the like). The internal memory 132 may be a Solid State Drive (SSD).

The external memory 134 may include a flash drive, for example, Compact Flash (CF), Secure Digital (SD), Micro-SD, Mini-SD, extreme-Digital (xD), a memory stick, and the like. The external memory 134 may be functionally connected with the electronic device 101 through various interfaces. The electronic device 101 may further include a storage device (or a storage medium) such as a hard drive.

The sensor module 140 measures a physical quantity or detects an operation state of the electronic device 101, and converts measured or detected information into electric signals. The sensor module 240 includes at least one of a gesture sensor 140A, a gyro sensor 140B, a barometric pressure sensor 140C, a magnetic sensor 140D, an acceleration sensor 140E, a grip sensor 140F, a proximity sensor 140G, a color sensor 140H (e.g., Red, Green, Blue (RGB) sensor), a biosensor 140I, a temperature/humidity sensor 140J, an illumination sensor 140K, and a Ultraviolet (UV) sensor 140M. Additionally or alternatively, the sensor module 140 may include an E-nose sensor, an electromyography (EMG) sensor, an electroencephalogram (EEG) sensor, an electrocardiogram (ECG) sensor, an infrared ray (IR) sensor, an iris sensor, a fingerprint sensor, and the like. The sensor module 140 may further include a control circuit to control at least one sensor included therein.

The input device 150 includes a touch panel 152, a (digital) pen sensor 154, a key 156, or an ultrasonic input device 158.

The touch panel 152 recognizes a touch input in at least one method of capacitive, resistive, infrared, and ultrasonic methods. In addition, the touch panel 152 may further include a control circuit. In the capacitive method, the touch panel 152 recognizes physical contact or hovering. The touch panel 152 may further include a tactile layer. In this case, the touch panel 152 provides a tactile response to the user.

The (digital) pen sensor 154 may be implemented in the same or similar method as the method of receiving a user's touch input or by using a separate detection sheet.

The key 156 includes a physical button, an optical key, or a keypad.

The ultrasonic input device 158 allows the electronic device 101 to detect sound waves through the microphone 188 through an input tool generating ultrasonic signals and identify data, and is capable of wireless recognition. The electronic device 101 may receive a user input from an external device connected thereto (for example, a computer or a server) by using the communication module 120.

The display 160 includes a panel 162, a hologram device 164, or a projector 166.

For example, the panel 162 may be a Liquid Crystal Display (LCD) or an Active Matrix Organic Light Emitting Diode (AM-OLED). For example, the panel 162 may be implemented to be flexible, transparent, or wearable. The panel 162 may be configured as a single module along with the touch panel 152.

The hologram device 164 displays a stereoscopic image in the air using interference of light.

The projector 166 displays an image by projecting light onto a screen. The screen may be located inside or outside the electronic device 101.

The display 160 may further include a control circuit to control the panel 162, the hologram device 164, or the projector 166.

The interface 170 includes a High Definition Multimedia Interface (HDMI) 172, a Universal Serial Bus (USB) 174, an optical interface 176, or D-subminiature (sub) 178. Additionally or alternatively, the interface 170 may include a Mobile High Definition Link (MHL) interface, a Secure Digital (SD)/Multimedia Card (MMC) interface or Infrared Data Association (IrDA) standard interface.

The audio module 180 converts a sound and an electric signal bidirectionally. The audio module 180 processes sound information which is input or output through a speaker 182, a receiver 184, an earphone 186, or the microphone 188.

The camera module 191 is a device for photographing a still image and a moving image, and includes one or more image sensors (for example, a front surface sensor or a rear surface sensor), a lens, an Image Signal Processor (ISP), or a flash (for example, a Light Emitting Diode (LED) or a xenon lamp).

The power management module 195 manages power of the electronic device 101. The power management module 195 includes a Power Management IC (PMIC), a charger IC, or a battery gauge.

For example, the PMIC may be mounted in an integrated circuit or a SoC semiconductor. The charging method may be divided into a wire charging method and a wireless charging method. The charger IC may charge a battery and may prevent inflow of overvoltage or over current from a charger. The charger IC includes a charger IC for at least one of the wire charging method and the wireless charging method.

The wireless charging method includes a magnetic resonance method, a magnetic induction method, or an electromagnetic wave method, and an additional circuit for charging wirelessly, for example, a circuit such as a coil loop, a resonant circuit, a rectifier, and the like may be added.

For example, the battery gauge measures a remaining battery life, a voltage, a current, or temperature of the battery 196 during charging. The battery 196 stores or generates electricity and supplies power to the electronic device 101 by using stored or generated electricity. The battery 196 includes a rechargeable battery or a solar battery.

The indicator 197 displays a specific state of the electronic device 101 or a part of it (for example, the AP 110), for example, a booting state, a message state, or a charging state.

The motor 198 converts an electric signal into a mechanical vibration. The electronic device 101 includes a processing device (for example, a GPU) for supporting a mobile TV. The processing device for supporting the mobile TV processes media data according to standards such as Digital Multimedia Broadcasting (DMB), Digital Video Broadcasting (DVB), or media flow.

FIGS. 2A to 2J are cross-sectional views illustrating configurations of touch sensors, according to an embodiment of the present disclosure of the present disclosure.

Referring to FIGS. 2A to 2J, various configurations of touch input units mounted on a display of an electronic device 101 will be described. The above-mentioned touch input units each include a plurality of touch recognition sensors, a display, and a window.

The plurality of touch recognition sensors include a TSP and a fingerprint panel (FP). The TSP is configured by a formation of a touch recognition sensor pattern for recognizing a touch input on the display. The TSP pattern refers to a pattern in which a Tx and an Rx are formed, and may be configured according to various methods. The FP includes a fingerprint recognition sensor pattern for recognizing a fingerprint input on the display. The FP has a pattern including a Tx and an Rx.

The TSP and the FP may or may not overlap and may be disposed in parallel. In a normal situation, a distance of the pattern of the TSP may be several mm. However, when the TSP is 500 dpi, a difference in the distance of each pattern may be 50 μm. The TSP and the FP may be divided according to a configuration of such a pattern. Both the TSP and the FP may use a capacitance method. The capacitance method senses whether a touch is generated by sensing a change in capacitance when a finger touches the touch screen.

The display includes, for example, an AMOLED and a Thin Film Transistor (TFT)-LCD display.

The window includes a transparent window.

Figure 2A:
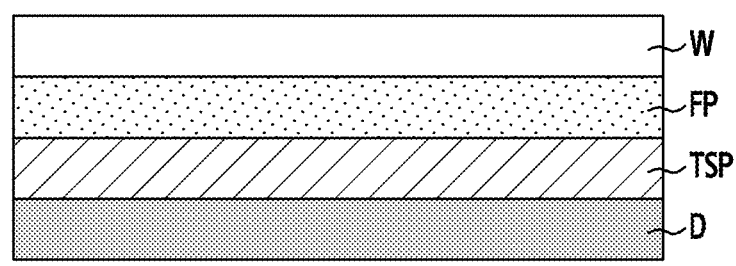
FIGS. 2A to 2J are cross-sectional views illustrating configurations of touch sensors, according to an embodiment of the present disclosure.

Referring to FIG. 2A, in an electronic device 101, a touch sensor for a touch input TSP is disposed on a display D to overlap the display D. A fingerprint sensor for a fingerprint input FP is disposed on the TSP to overlap the TSP. A window W is attached on the FP to overlap the FP.

Figure 2B:
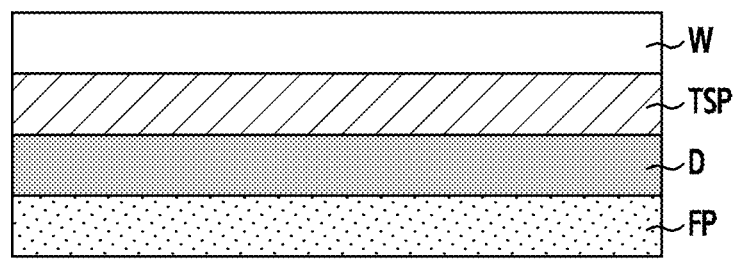

Referring to FIG. 2B, in electronic device 101 a touch sensor TSP is disposed on a display D to overlap the display D. A fingerprint sensor FP is disposed under the display D to overlap the display D. A window W is disposed on the TSP to overlap the TSP. Since an electrode array density of the FP is larger than that of the TSP, the FP may be disposed under the display D in consideration of a visibility of the display D.

Figure 2C:
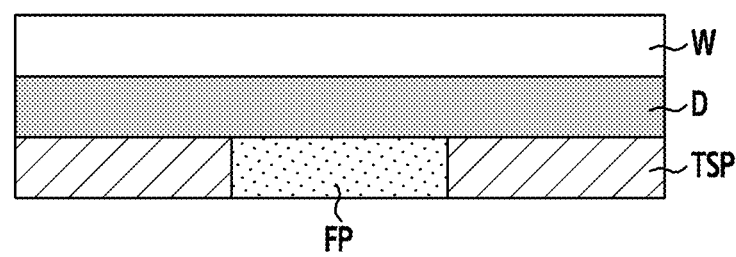

Referring to FIG. 2C, in an electronic device 101 a touch sensor TSP and a fingerprint sensor FP are disposed under a display D. The TSP and the FP do not overlap and are disposed in parallel. A window W is disposed on the display D to overlap the display D. The FP and the TSP are disposed under the display D in consideration of a visibility of the display D.

Figure 2D:
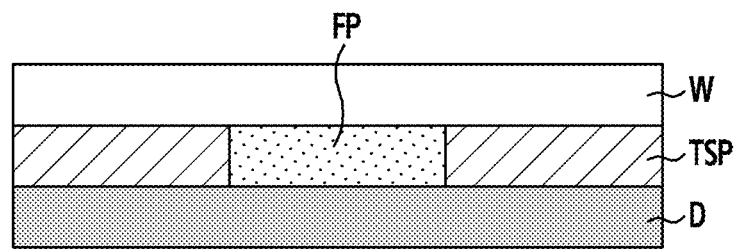

Referring to FIG. 2D, in an electronic device 101 a touch sensor TSP and a fingerprint sensor FP are disposed above a display D to overlap the display D. The TSP and the FP do not overlap and are disposed in parallel. A window W is disposed on the FP to overlap the FP.

Figure 2E:
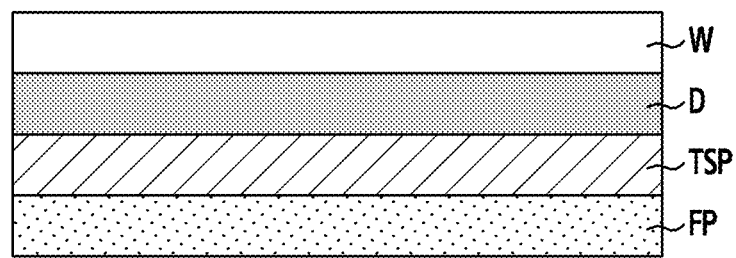

Referring to FIG. 2E, in an electronic device 101 a touch sensor TSP is disposed under a display D to overlap the display D. A fingerprint sensor FP is disposed under the TSP to be overlapped by the TSP. A window W is disposed on the display D to overlap the display D.

Figure 2F:
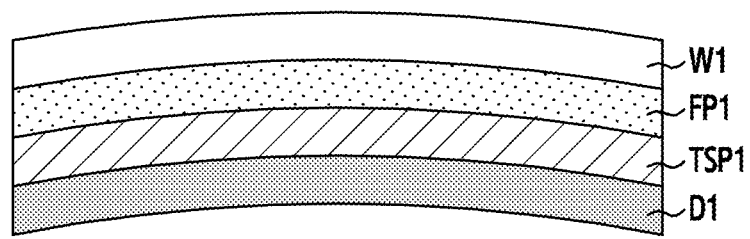

Referring to FIG. 2F, in an electronic device 101 a curved touch sensor TSP1 is disposed on a curved display D1 to overlap the curved display D1. The TSP1 is a curved panel for receiving a user input on a touch screen. The curved display D1 includes any of a flexible display, a curved display, or a bendable display. A curved fingerprint sensor FP1 is disposed on the TSP1 to overlap the TSP1. A curved window W1 is disposed on the FP1 to overlap the FP1. When the display is the curved display D1, the fingerprint recognition may be performed in a swipe method.

Figure 2G:
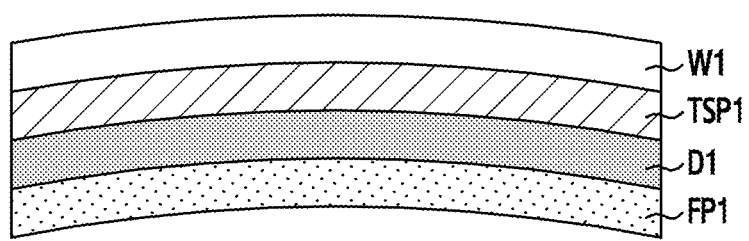

Referring to FIG. 2G in an electronic device 101 a curved touch sensor TSP1 is disposed on a curved display D1 to overlap the curved display D1. The TSP1 is a curved panel for receiving a user input on a touch screen. A curved fingerprint sensor FP1 is disposed under the curved display D1 to be overlapped by the curved display D1. A curved window W1 is disposed on the TSP1 to overlap the TSP1.

Figure 2H:
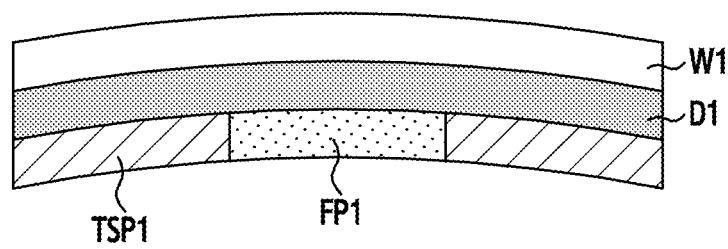

Referring to FIG. 2H, in an electronic device 101 a curved touch sensor TSP1 and a curved fingerprint sensor FP1 are disposed under a curved display D1 to be overlapped by the curved display D1. The TSP1 is a curved panel for receiving a user input on a touch screen. The TSP1 and the FP1 do not overlap and are disposed in parallel. A curved window W1 is disposed on the curved display D1 to overlap the curved display D1.

Figure 2I:
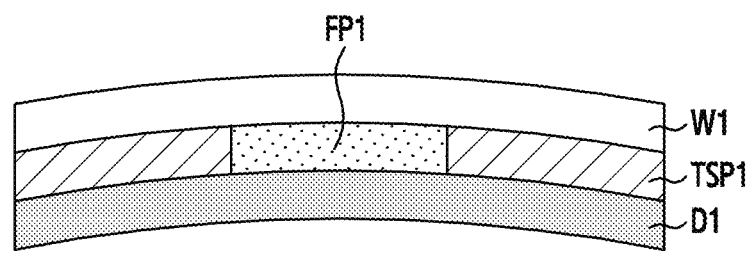

Referring to FIG. 2I, in an electronic device 101 a curved touch sensor TSP1 and a curved fingerprint sensor FP1 is disposed on a curved display D1 to overlap the curved display D1. TSP1 and the FP1 do not overlap and are disposed in parallel. A curved window W1 is disposed on the TSP1 and the FP1 to overlap the TSP1 and the FP1.

Figure 2J:
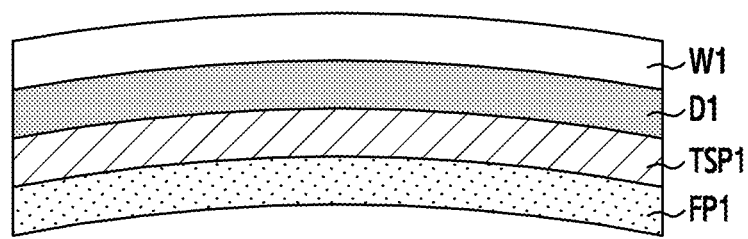

Referring to FIG. 2J, in an electronic device 101 a curved touch sensor TSP1 is disposed under a curved display D1 to overlap the curved display D1. A curved fingerprint sensor FP1 is disposed under the TSP1 to overlap the TSP1.

In addition, a curved window W1 is disposed on the curved display D1 overlap the curved display D1. The curved window w1 includes a transparent window.

Figure 3:
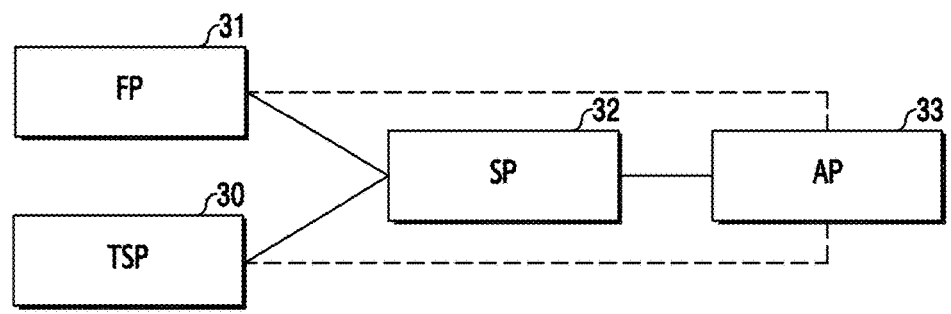
FIG. 3 is a block diagram illustrating a structure in which a touch screen panel (TSP) and an fingerprint panel (FP) are connected to a processor, according to an embodiment of the present disclosure.

FIG. 3 is a block diagram illustrating a structure in which a touch screen panel (TSP) and an fingerprint panel (FP) are connected to a processor, according to an embodiment of the present disclosure.

Referring to FIG. 3, a TSP 30 may be connected to an Application Processor (AP) 33 to provide touch information. The touch information provides a coordinate such as x and y based on a screen resolution, multi-touch information (e.g., information on the number of input touches), information on whether a hovering is generated (e.g., information on the position and the height of the hovering) and area touch information (e.g., information on an area of the touch region, and information on a long axis and a short axis of an area).

The TSP 30 may be connected to a Supplementary Processor (SP) 32 which is configured in addition to the AP 33. The SP 32 is a processor independent from the AP 33. The SP 32 has lower power requirements than that of the AP33, but may be driven in comparatively low power compared to the AP 33. Therefore, the SP 32 may always receive an input from the TSP 30 or the FP 31. Thus, even though the AP 33 is in a sleep state, since the SP 32 is driven in low power, the SP 32 may be always maintained in an awake state. In addition, even in a state in which the AP 33 is in a sleep state, that is, a state in which a screen is turned off, it may be confirmed whether a user input is generated through the TSP 30 and the FP 31.

Each of the panels TSP 30 and FP 31 and each of the processors SP 32 and AP 33 may be connected in various methods such as an Inter-IC (I2C) and a Universal Asynchronous Receiver/Transmitter (UART). If the TSP 30 is connected to the SP 32, the user may perform the touch input even in the state in which the AP 33 is the sleep state. For example, when a state in which a screen is touched in a specific condition is sensed, the AP 33 may be awakened and thus the screen may be turned on.

In addition, when the FP 31 is connected to the SP 32, the fingerprint recognition may be performed even in the state in which the AP 33 is in the sleep state. For example, when a user touches a screen using a finger and thus a specific user is recognized, the screen is awakened, the user is automatically authenticated, and a lock screen may be unlocked. At this time, in the state in which the FP 31 and the TSP 30 are connected to the SP 32, and the AP 33 is in the sleep state, only the TSP 30 may be executed through the SP 32. If a touch event is generated in the TSP 30, a point or an area where the touch event is generated may be determined, and the FP 31 matched to a corresponding point or area may be enabled.

The FP 31 and the TSP 30 may be directly connected to the AP 33 to receive the fingerprint recognition or the touch operation.

As described above, the connection among the SP 32, the FP 31 and the TSP 30 may awaken the AP 33 simply from the state in which the AP 33 is the sleep state or the screen locked state, or may unlock the screen. Therefore, a current consumption is reduced when an electronic device is used, and usability is improved.

A capacitance method has characteristics in which a value is changed according to a dielectric constant of a dielectric disposed between the Tx and the Rx, and the ridges and the valleys of the fingerprint of the finger are determined using this characteristics. After this information is formed in a successive form, an image type is finally formed, and thus a unique pattern of the fingerprint is formed.

The fingerprint sensor may use various methods such as a capacitance type, an ultrasonic type, and an optical type. However, the basic principle is a determination of the ridges and the valleys of the fingerprint of the finger to determine an authentication, and thus the basic principle is the same.

The fingerprint sensor may include a swipe type (i.e., 1D type) and an area type (i.e., 2D type) according to a method of implementing the Tx and the Rx.

The swipe type recognizes the fingerprint in the Rx which is formed in a line of a 1D type, and forms a shape of the fingerprint by combining successive images generated at the time of swiping.

In contrast, the area type reads an imprinted type at once and generates a fingerprint image based on this, when a finger touches an input surface in the Tx and the Rx formed in a regular distance.

Figure 4:
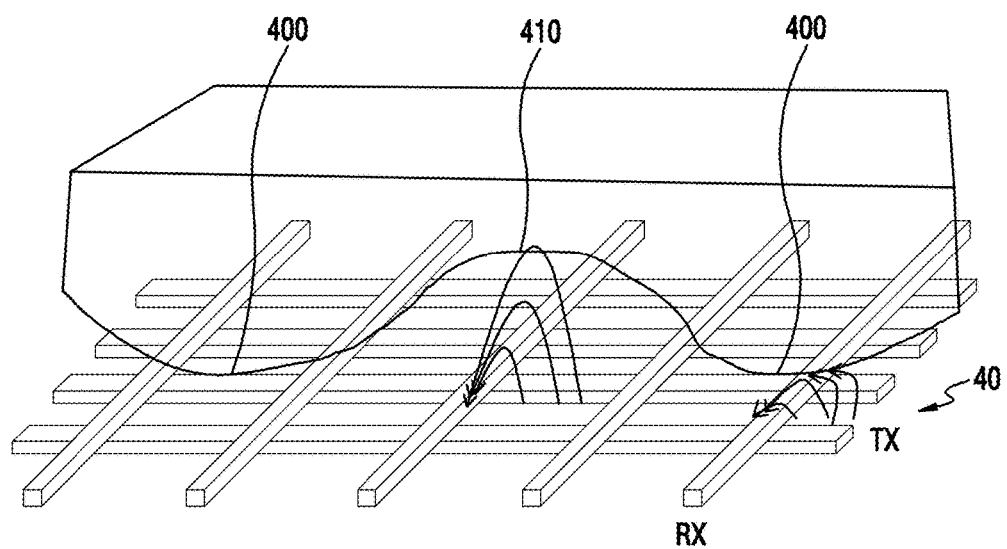
FIG. 4 is a view illustrating a fingerprint recognition structure of a 2 Dimensional (2D) fingerprint sensor, according to an embodiment of the present disclosure.

FIG. 4 is a view illustrating a fingerprint recognition structure of a 2 Dimensional (2D) fingerprint sensor, according to an embodiment of the present disclosure.

Referring to FIG. 4, a principle of a 2D fingerprint sensor 40 is illustrated. When a finger touches the fingerprint sensor 40, the Rx senses a change of a capacitance between the Rx and the Tx, and the change of the capacitance is digitized. A ridge 400 and a valley 410 of the fingerprint may be determined through the digitized value, and a fingerprint shape may be determined in various steps of gray scales through a total value.

The fingerprint sensor 40 receives a touch input of a user, differently from a another type of sensor, and thus a layer of a panel type should be formed. This may be referred to as a fingerprint recognition panel or a Fingerprint Panel (FP). For example, the fingerprint recognition panel includes a fingerprint recognition sensor pattern including a plurality of first electrodes (i.e., patterns) of a first direction and a plurality of second electrodes (i.e., patterns) of a second direction.

A main object of the FP 40 is the fingerprint recognition, but the FP 40 may receive an input through a touch of the touch screen. A basic principle of the fingerprint sensor of the capacitance type is not largely different from that of the TSP, and thus a touch input such as a press, a release and move is possible in addition to the fingerprint input.

In contrast, since a method of the FP and a method of the TSP are similar, when the FP and the TSP are simultaneously executed in an overlapping state, a value of the Tx becomes large, and a distance between the Tx and the Rx becomes not uniform. Therefore, the panels mutually influence and interfere with each other. Thus, when the TSP and the FP are simultaneously executed, an accurate measurement of both of the TSP and the FP may be difficult. In order to this, an effective control of the TSP and the FP is important.

Figure 5:
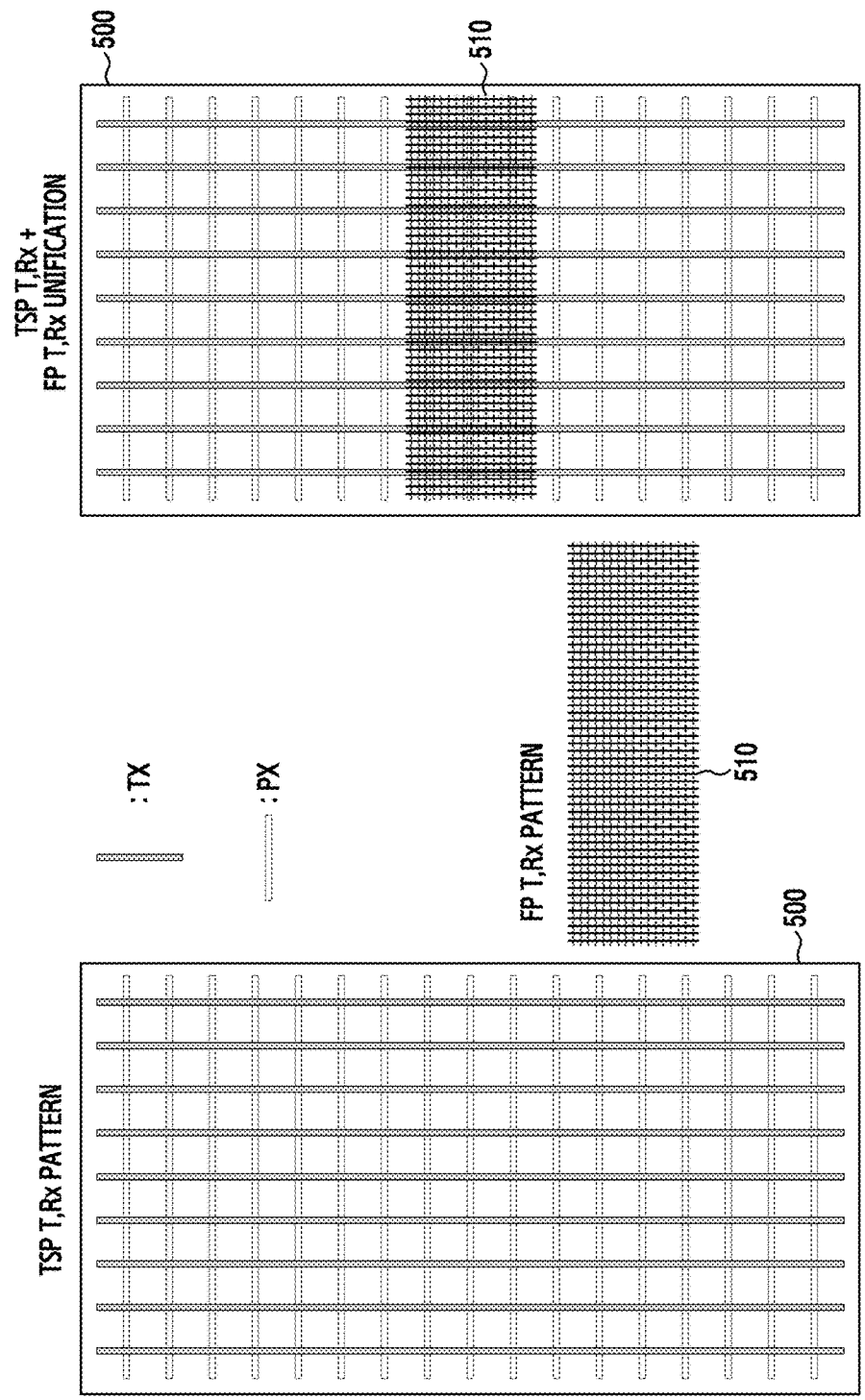
FIG. 5 is a view illustrating a complex type touch sensor, according to an embodiment of the present disclosure.

FIG. 5 is a view illustrating a complex type touch sensor, according to an embodiment of the present disclosure.

Referring to FIG. 5 a type of sensor in which a TSP 500 and an FP 510 are combined is provided. The TSP 500 and the FP 510 form different layers, and each of the Tx and Rx patterns overlap. In the case of the TSP 500, when a finger performs a touch input on the TSP 500, a capacitance of an area where the touch input occurs changes. At this time, a position where the touch input is generated is calculated through positions of the Tx and the Rx of the input area to determine coordinate information. In the same manner, in the case of the FP 510, when the finger touches the FP 510, a capacitance of the touched area changes, and the fingerprint image is obtained through a leveling of a measured value.

As described above, the principles of the TSP 500 and the FP 510 are similar. However, a detailed processing method or object may be different. This is because a main function of the TSP 500 is a determination of a point where a finger touches and a main function of the FP 510 is a generation of a shape of the fingerprint in the fingerprint sensor.

The TSP 500 and the FP 510, also have a detailed difference in using a difference of the capacitance. In the case of the TSP 500, when the distances between the Tx and the Rx are too small, an interference of the Tx and the Rx may be generated, and thus it may have a negative influence on determining an accurate position. That is, when a touch is too sensitive and thus a change of the value is large, a change of a measured value becomes large and thus a point coordinate is not stably output. Therefore, a touch recognition itself may be felt unnaturally, and thus a certain measured value filtering is necessary. Thus, the TSP 500 needs a proper level of Tx and Rx distances (e.g., about several mm).

In contrast, since the fingerprint sensor of the FP 510 measures shapes of the ridges and the valleys of the fingerprint the distances between the Tx and the Rx should be small. This distance should be a minimum level capable of reading a normal pattern of a fingerprint, and shorter may not be better. This distance is not related to the size of the electronic device. In general, the distance of the Tx and the Rx should be about 50 µm to generate a stable fingerprint image.

Accordingly, in FIG. 5, the TSP 500 and the FP 510 have different distances of Tx and Rx. However, the TSP 500 and the FP 510 are not always arranged in a lattice pattern as shown in FIG. 5. This is merely an example, and the Tx and the Rx may be disposed in various types. However, there must be a difference in the distances of the Tx and the Rx of the TSP 500 and the FP 510, due to characteristics thereof, and a method for structurally combining these is necessary.

FIGS. 6A to 6C are views illustrating examples in which an FP is disposed at a TSP according to an embodiment of the present disclosure.

Referring to FIGS. 6A to 6C various examples in which the TSP and the FP are physically disposed are provided. The TSP and the FP may be disposed in various configurations. FIGS. 6A to 6C each illustrate a front view, a plan view and a right side view of the configuration.

Referring to FIG. 6A, is configuration in which the TSP and the FP overlap. In this configuration, the FP 620 is operated on an area where the TSP 610 is driven. This configuration has advantages in which the FP 620 may be installed in a random position. But, when the TSP 610 and the FP 620 are simultaneously operated, the Tx is simultaneously operated, and thus a charge amount applied to the Rx is influenced. Therefore, an accurate measurement may not be performed, and thus an error may be generated in a recognition of a fingerprint or a touch.

As described above, when the TSP 610 and the FP 620 are simultaneously driven, one of the TSP 610 and the FP 620 may be operated, or at least one Tx may be operated. For example, the fingerprint may be recognized by stopping a use of the Tx and the Rx of an overlapping area in the TSP 610 and using only the Tx and the Rx of the FP 620. Alternatively, a use of the Tx of the TSP 610 may be stopped and only the Tx and the Rx of the FP 620 may be used to recognize the fingerprint. This case uses the Rx of the TSP 610, and a touch position may be determined using a charge amount generated between the Tx of the FP 620 and the Rx of the TSP 610.

Referring to FIG. 6B a configuration in which the TSP 630 and the FP 640 do not overlap, and are disposed in parallel is provided. The FP 640 is disposed under the TSP 640. This configuration does not generate an interference between the TSP 630 and the FP 640. However, when a touch is recognized, the TSP 630 cannot be used as a whole, and a partial section of a screen must recognize the touch by using the FP 640. In this case, when a partial Tx and Rx of the FP 640 are used, the touch operation may be performed like the TSP 630.

Referring to FIG. 6C a configuration in which the TSP 650 and the FP 660 do not overlap, and are disposed in parallel is provided. The FP 660 is disposed at a right side of the TSP 650. This configuration does not generate an interference between the TSP 650 and the FP 660. However, when a touch is recognized, the TSP 630 cannot be used as a whole, and a partial section of a screen must recognize the touch by using the FP 660. In this case, when a partial Tx and Rx of the FP 660 are used, the touch operation may be performed like the TSP 650.

Figure 7:
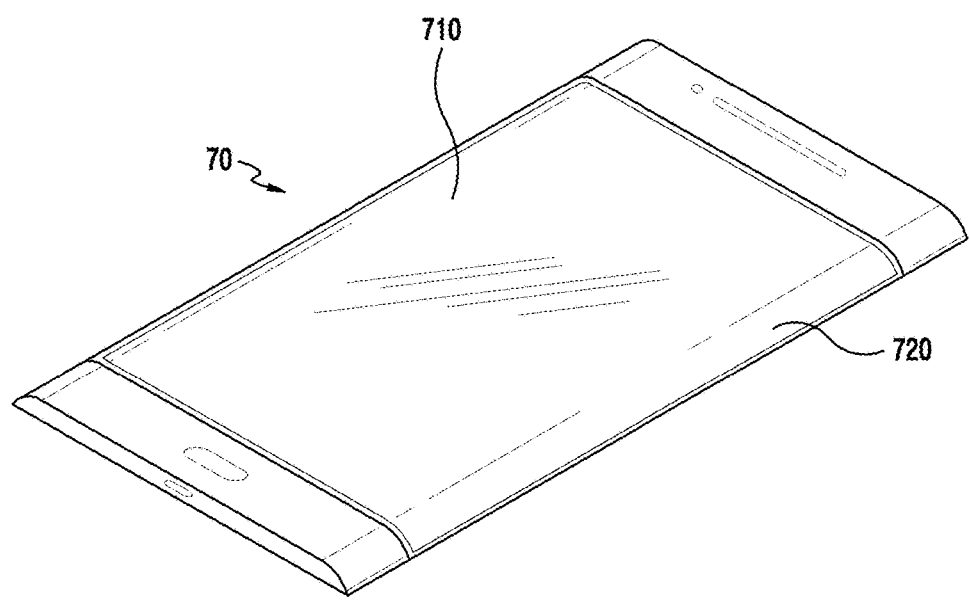
FIG. 7 is a perspective view illustrating an electronic device in which an FP is disposed at a TSP, according to an embodiment of the present disclosure.

FIG. 7 is a perspective view illustrating an electronic device in which an FP is disposed at a TSP, according to an embodiment of the present disclosure.

Referring to FIG. 7, in an electronic device 70 having a first display 710 and a second display 720, since the first display 710 and the second display 720 basically provide independent user experiences, the FP may be configured as shown in FIG. 6C. When the second display 720 is configured as shown in FIG. 6C, the first display 710 may mainly perform a function of a touch, and the second display 720 recognizes a fingerprint. Therefore, a panel specialized according to a display may be provided, and thus a specialized UX may be provided to a user. Although it will be described below, the first display 710 may be a flat display, and the second display 720 may be a curved display.

Figure 8B:
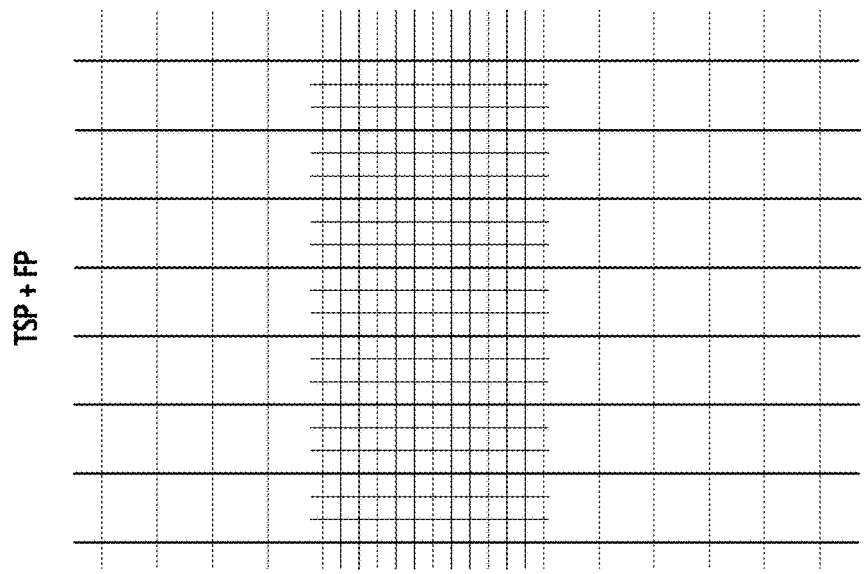
FIGS. 8A and 8B are views illustrating complex type touch sensors, according to an embodiment of the present disclosure.
Figure 8A:
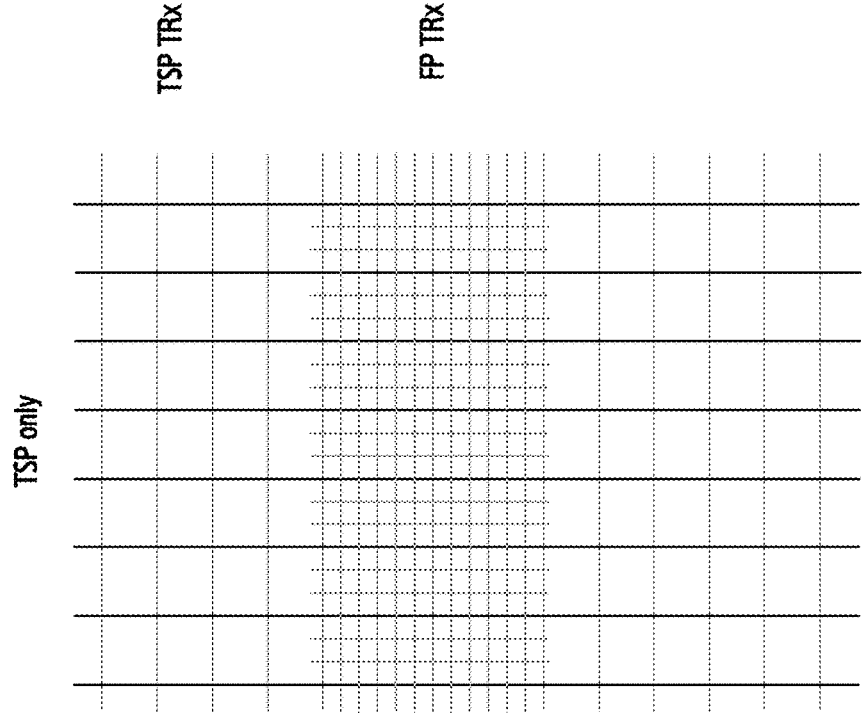

FIGS. 8A and 8B are views illustrating complex type touch sensors, according to an embodiment of the present disclosure.

Referring to FIGS. 8A and 8B, a TSP and an FP may be implemented simultaneously in one panel by changing dispositions of a Tx and an Rx and hardware (HW) control structure. The Tx and the Rx forming the TSP and the Tx and the Rx forming the FP are formed in the same panel, and are formed in a hybrid type. Since a single layer (i.e., each panel does not overlap and is disposed in parallel) may be used, there is an advantage in which a thickness of a device may be reduced.

When only the TSP is used, as shown in FIG. 8A, a current is not transmitted to the Tx and the Rx of the FP, and thus the Tx and the Rx of the FP are not operated. Thus, it may be used in an equivalent manner as a normal TSP.

However, when the TSP and the FP are simultaneously used, as shown in FIG. 8B, the Tx and the Rx of the FP, which are formed at a regular distance, are added between distances of the Tx and the Rx of the TSP. Therefore, the added area may play a role of a fingerprint sensor. Such an operation may be controlled in a H/W (hardware) manner according to whether a fingerprint input mode is executed or removed in the electronic device 70.

Figure 9:
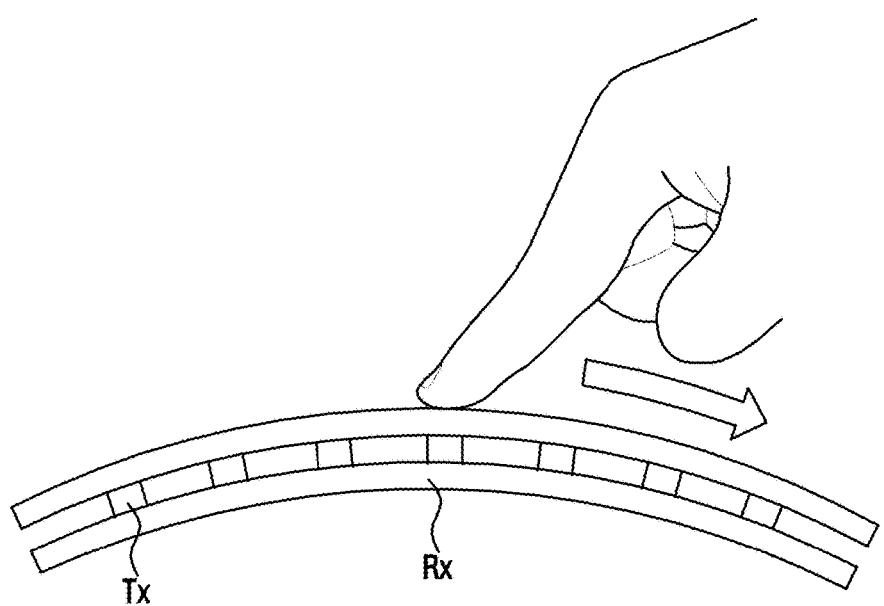
FIG. 9 is a view illustrating a swipe operation in a 1D touch sensor, according to an embodiment of the present disclosure.

FIG. 9 is a view illustrating a swipe operation in a 1D touch sensor, according to an embodiment of the present disclosure.

Referring to FIG. 9, a fingerprint sensor is generally disposed in a structure receiving an input of a flat 2D type. However, in a structure having a curved display and a TSP, it may be difficult to apply an FP in a structure of a normal 2D type. This is because when distances of a Tx and an Rx are warped, a shape of a fingerprint is twisted. To this solve this, a line which is perpendicular to a curved direction is set as the Rx, and a user may be induced to swipe vertically to a position where the Rx is activated. In this case, when the Tx is formed in a uniform distance, a capacitance is generated between a plurality of arranged Txs and one Rx, and the capacitance is sensed to generate an image. As described above, when the user swipes a finger, the fingerprint is read, successive images are stored, a fingerprint image is generated, and an authentication is possible. In order to receive an input through the FP and perform a required operation according to the input, state information of the FP should be defined. The state information means information of the FP matched with an input of the TSP, when a touch input is received through the TSP. This information is necessary to provide a proper UI, when an OS or a platform operating the electronic device 101 provides a finger related service or function.

The state information of the FP is shown in Table 1.

TABLE 1

| State Information |
|---|
| Operation state information of the FP: Enable/Disable |
| Input possible area of the fingerprint sensor, which is matched with a resolution of a display: (x, y, width, height) |
| Example: when it is (10, 10, 200, 400), the display shows that an area where the width is 200 and the height is 400 from (10, 10) is the fingerprint sensor input area. |
| Type of the fingerprint sensor: 1D/2D |
| Detailed information of the Tx and the Rx |
|     Numbers of each Tx and Rx |
|     Distance information of each Tx and Rx |
|     Information on whether the Tx and the Rx are operated (i.e., activated) or not: Tx[N], Rx[N] |
|     Example: when Tx[1] = 1 and Tx[2] = 0, a current is applied to the Tx[1] and the current is not applied to the Tx[2]. |

In the state information, the operation state information of the FP controls the FP to determine whether the FP is operated when the TSP and the FP overlap.

The value of the input possible area of the fingerprint sensor, which is matched with the resolution of the display may be changed according to the size and the resolution of a real screen of the fingerprint sensor of the electronic device 101. This area should be also matched with a touch coordinate input TSP. Information on this area is provided to the operating system or the platform in the electronic device 101. A fingerprint related UI may be generated using this area information in a module forming a GUI.

A type of the fingerprint sensor may be set in a type in which the fingerprint sensor is the 1D method or the 2D method.

The dimension of the sensor may be set by a user, and may be determined based on another state information. For example, when the display is flat, the fingerprint sensor of the 2D method may be used, and when the display is curved in one direction, the fingerprint sensor of the 1D method may be used.

A method of inputting by a user should also be changed according to a type (i.e., method) of the fingerprint sensor. Thus, a user guide which requires a registration or an input may also be changed based on the type of the fingerprint sensor.

The detailed information of the Tx and the Rx is information necessary to control the Tx and the Rx of the fingerprint sensor. When the operation state information of the FP is disabled, an overall state of the Tx and the Rx also be deactivated.

The numbers of each Tx and the Rx indicate the numbers of the Tx line and the Rx line formed in the fingerprint sensor.

The distance information of each Tx and the Rx indicates distances at which the Tx and the Rx are formed, and indicate each number of the Tx and the Rx and an area of the fingerprint sensor. This is an element indicating a comparative position difference when it overlaps with the TSP. The distance information may be indicated as a real distance, and may also be indicated as a Dot Per Inch (DPI).

The information on whether the Tx and the Rx are operated individually activate the Tx and the Rx, when the fingerprint sensor includes N Txs and M Rxs. Therefore, the Tx and the Rx may be controlled such that only a partial area may be recognized in a whole of the fingerprint sensor. For example, when Tx[10] to Tx[15] are turned off, a fingerprint sensor of a corresponding area is not operated. Such a setting sets the TRx of the FP, which is matched according to a position of the TSP input by the user, and a position to be activated may be fixed and determined according to characteristics (e.g., a left hand, a right hand, or a user designation) of a predetermined user.

In a case of a change between the 1D method and the 2D method of the fingerprint sensor, for a recognition of the 1D method, it may use only one Rx by enabling only one Rx to be recognized. Alternatively, the Tx and the Rx may be controlled such that the Tx and the Rx may sense in different directions by switching the Tx and the Rx. The electronic device 101 knows the position where the sensor can recognize the fingerprint in the FP, by using the information on the activated Tx and the Rx of the sensor, and connects this to the TSP and the display. When this is connected to the TSP, the TSP is activated in an area where the FP is deactivated, and when this is connected to the display, an area of the FP may be configured in a UI to be displayed.

Figure 10:
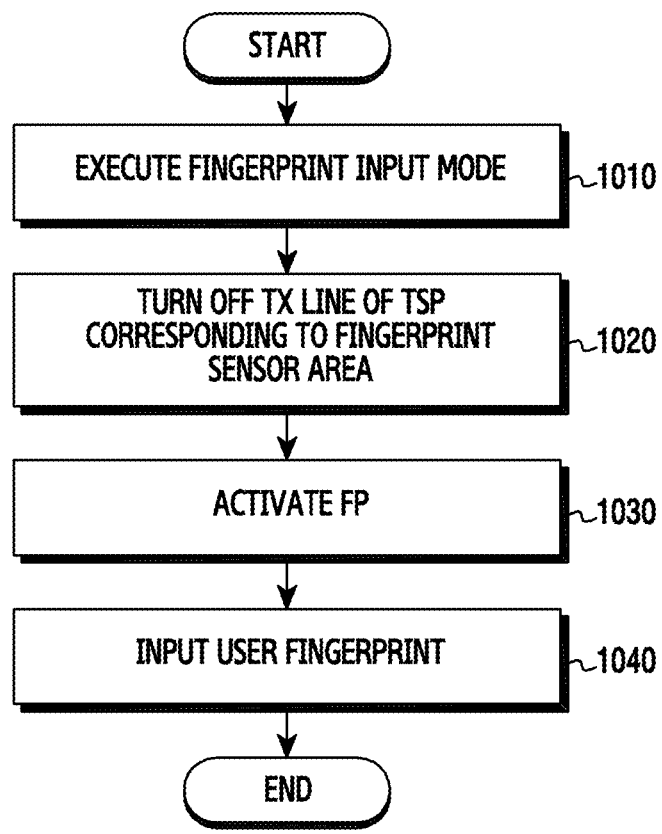
FIG. 10 is a flowchart of an operation of driving a fingerprint recognition of a touch sensor, according to an embodiment of the present disclosure.

FIG. 10 is a flowchart of an operation of driving a fingerprint recognition of a touch sensor, according to an embodiment of the present disclosure.

Referring to FIG. 10, in step 1010, in order to input a fingerprint in electronic device 101 by a user, a fingerprint sensor should be in an input mode state.

In step 1020, the fingerprint sensor may always be activated, but it is normal to turn off the sensor to reduce a current consumption when the sensor is not used in a mobile device.

A reason an activation control of the fingerprint sensor is necessary in the electronic device 101 is because a problem may be generated when a TSP and an FP in which the fingerprint sensor is installed overlap. This is because a charge amount received by the Rx may be changed when the charge is generated simultaneously in a Tx of the TSP and a Tx of the FP. In the case of the fingerprint sensor, an image is generated using a capacitance generated between the Tx and the Rx. However, when this value is influenced, naturally an image shape is changed, and thus a fingerprint authentication cannot be performed.

In step 1030, the FP of the electronic device 101 is activated when a user executes an application or a function for a fingerprint input to input the fingerprint. At this time, a fingerprint input possible area is defined based on the state information of the FP, and this area is activated such that the fingerprint input is possible in this area. In addition, the application or the function displays a UI which enables the user to input the fingerprint.

In step 1040, the user inputs the fingerprint.

When the FP is activated, the TSP of an area where the FP and the TSP overlap may be operated together. Therefore, as described above, the Tx of the TSP influences the Rx of the FP, and thus it may be difficult to generate an accurate fingerprint shape. Accordingly, when the FP is activated, at least, the operation of the TSP overlapping the FP is controlled. For reference, even in a state in which an AP is in a sleep state and thus a display is turned off, the fingerprint recognition is possible.

Figure 11:
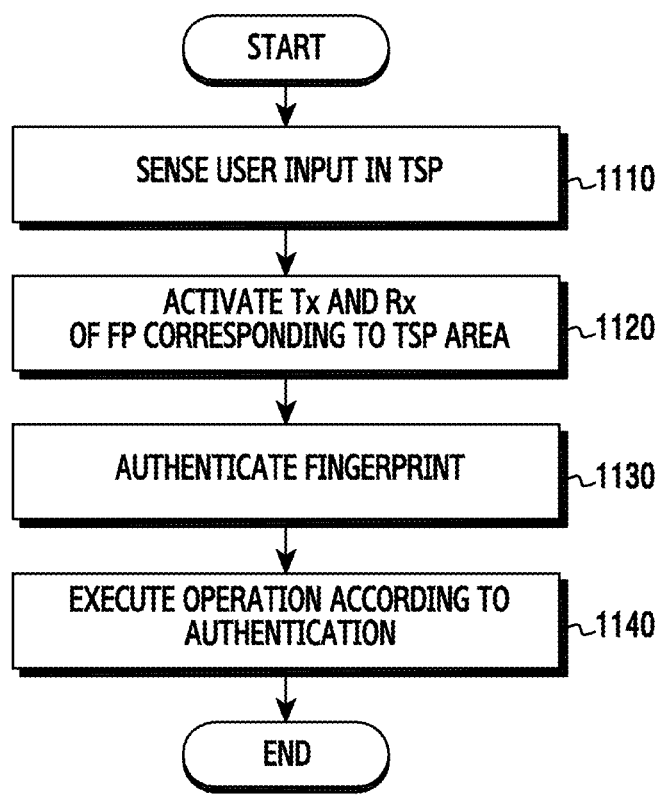
FIG. 11 is a flowchart of an operation of driving a fingerprint recognition of a touch sensor, according to an embodiment of the present disclosure.

FIG. 11 is a flowchart of an operation of driving a fingerprint recognition of a touch sensor, according to an embodiment of the present disclosure.

Referring to FIG. 11, a method for operating the fingerprint recognition using an FP and a TSP connected to an SP in a state in which an AP is in a sleep state is provided.

In step 1110, the TSP senses a touch of a user.

In step 1120, the FP is activated based on a sensed touch position, or alternatively, only Tx and Rx lines adjacent to a touch area of the TSP may be activated in the FP.

In step 1130, after a fingerprint input, a fingerprint authentication is executed.

In step 1140, a screen is unlocked, or a designated operation such as a camera execution is performed according to the fingerprint authentication.

Figure 12:
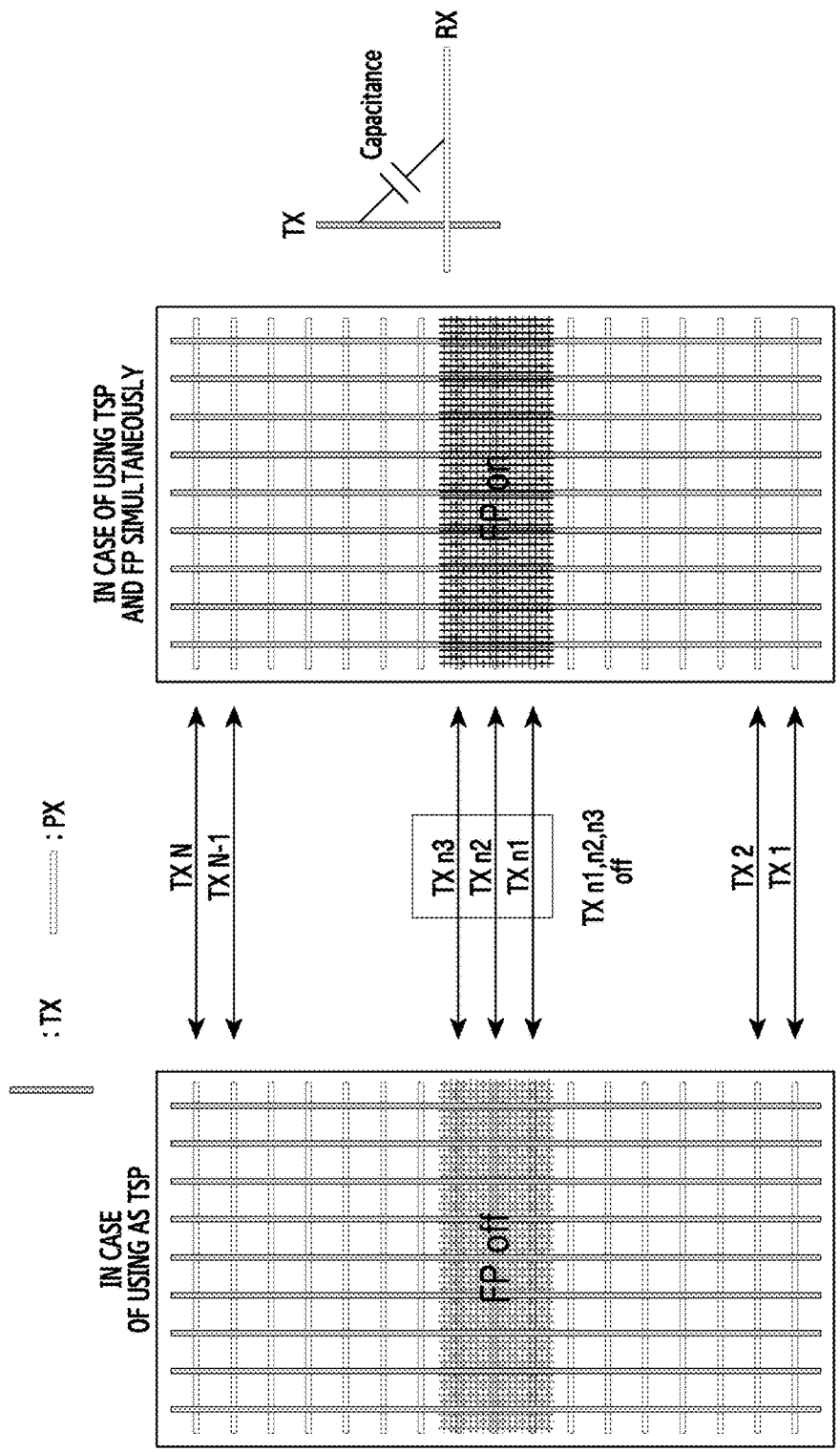
FIG. 12 is a view illustrating a complex type touch sensor, according to an embodiment of the present disclosure.

FIG. 12 is a view illustrating a complex type touch sensor, according to an embodiment of the present disclosure.

Referring to FIG. 12, an example in which a TSP and an FP are simultaneously used is provided. In electronic device 101, a processor 110 determines whether a fingerprint recognition mode is executed and selectively activates the touch recognition sensor pattern and the fingerprint recognition sensor pattern. When only the TSP is used, Tx and Rx lines of the FP are disabled, and thus the TSP may be used.

However, when the TSP and the fingerprint sensor are simultaneously used, mutual interference of the TSP and the FP may be controlled not to be generated, by turning off the Tx line overlapping the FP, among the Tx lines of the TSP.

As shown in FIG. 12, the FP is turned on and operated, by turning off n1, n2 and n3 of the Tx line, which are areas overlapping the FP. In this case, the TSP knows information on the n1, n2 and n3 in advance. Values of the n1, n2 and n3 may be changed.

Figure 13:
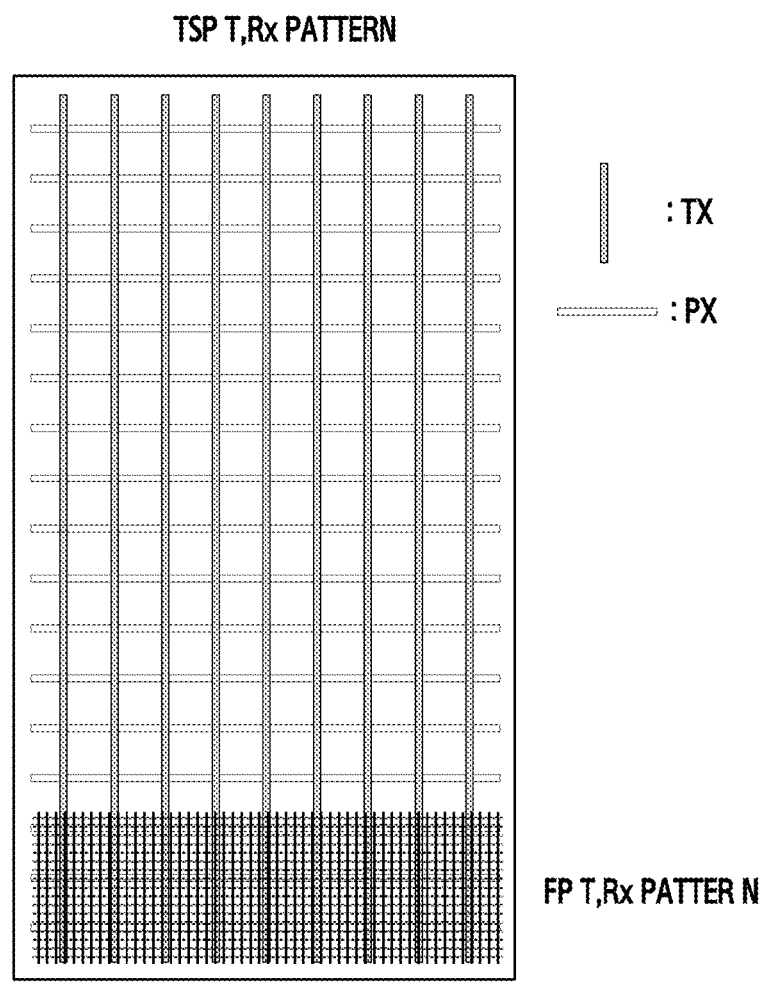
FIG. 13 is a view illustrating a touch sensor, according to an embodiment of the present disclosure.

FIG. 13 is a view illustrating a touch sensor, according to an embodiment of the present disclosure.

Referring to FIG. 13, when a TSP and an FP do not overlap and are disposed in parallel, since an interference between the TSP and the FP is not generated, each panel may be used. In this case, in order to match a recognition level of the FP with that of the TSP, some of Tx and Rx lines may be activated to be used together with Tx and Rx lines of the TSP.

The fingerprint sensor senses where a touch is generated and which touch operation, such as an up, a down, a left and a right, is generated in a navigation mode. However, since a structure and an arrangement of the fingerprint sensor are different from those of the TSP, the fingerprint sensor must calculate a touched position independently from the TSP. Accordingly, in order to drive the TSP and the FP in the manner of one large TSP, the TSP and the FP must be synthetically managed to perform a consistent recognition of a touch position and an operation.

However, to this end, structures of the TSP and the FP must be consistent and simultaneously processed, and may become complex systematically. Thus, it may be inefficient and a performance may not be good compared to a case of an operation of a single TSP. Therefore, such a method may be suitable for an electronic device having a dual display or first and second displays capable of providing independent UXs and scenarios in each panel.

Figure 14:
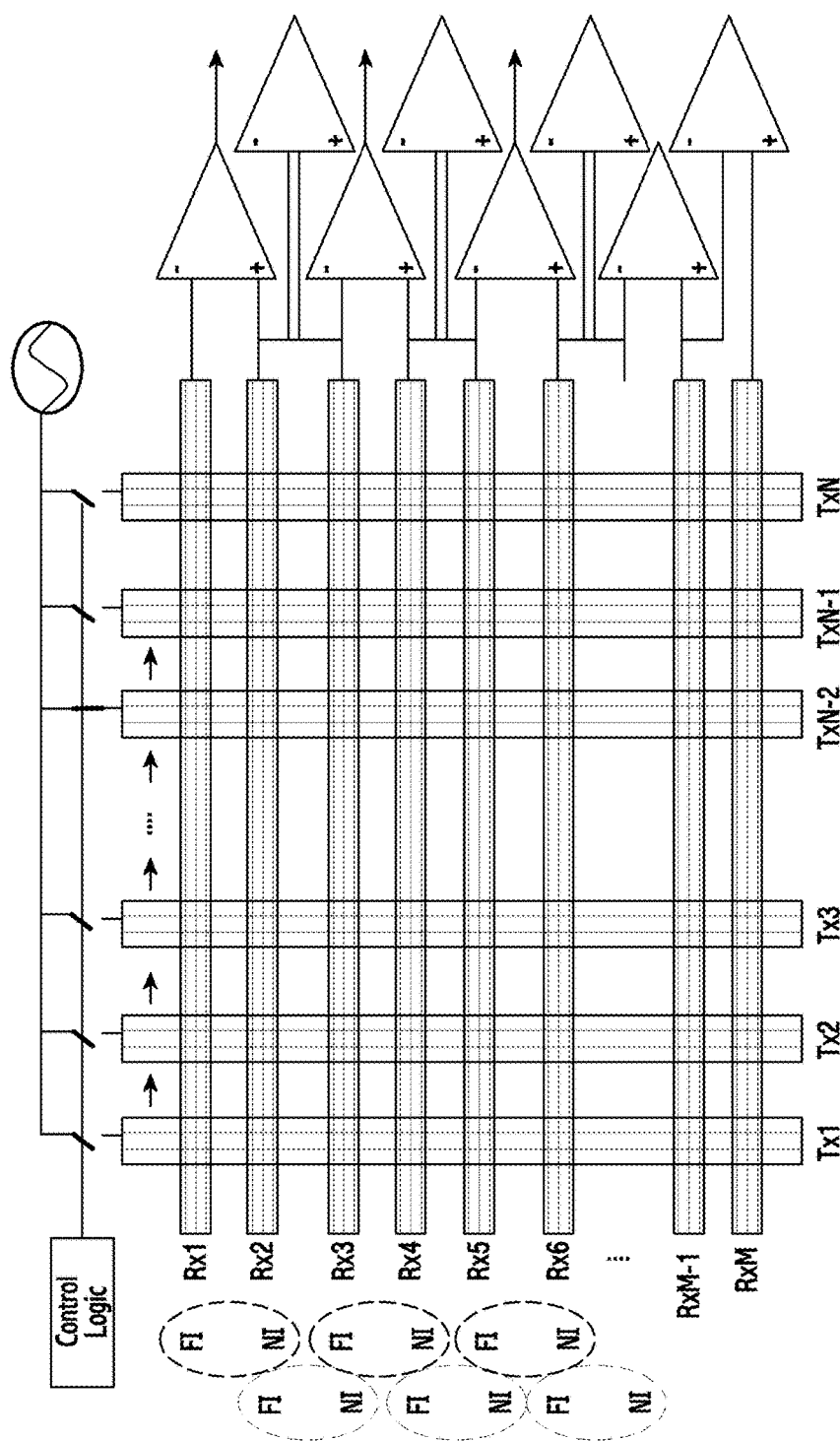
FIG. 14 is a view illustrating electrode lines of a 2D fingerprint sensor, according to an embodiment of the present disclosure.

FIG. 14 is a view illustrating electrode lines of a 2D fingerprint sensor, according to an embodiment of the present disclosure.

As shown in FIG. 14, a touch sensor may be a complex type in which a TSP and an FP are added as a single panel. The complex type touch sensor is a type in which the TSP includes the FP and Tx and Rx lines of the TSP and Tx and Rx lines of the FP overlap. Since the TRx of the FP is dense interval, in general, denser Tx and Rx are disposed in an arrangement of the Tx and the Rx of the TSP.

In the complex type touch sensor, when only TSP is used, the Tx and the Rx of the FP may be disabled. However, a common line which performs a fingerprint sensor role and is included in the Tx and the Rx of the TSP must be activated.

If the FP is used, the Tx and the Rx of the fingerprint sensor are activated, and the common Tx and Rx lines are also activated. In addition, a fingerprint sensor area is defined in the complex type touch sensor based on a predetermined fingerprint sensor area, and the Tx and the Rx of a corresponding area are used for the fingerprint recognition. Remaining areas may be used as the TSP.

When the FP is used, the FP may be partially divided and may be activated, rather than activating all areas in one FP. This may be designated by a user setting in a process of a state information definition of the FP. For example, in a case of a right-handed person, the Tx and the Rx of the FP positioned in a right side of a screen may be activated, and in a case of a left-handed person, the Tx and the Rx of the FP positioned in a left side of the screen may be activated. This has an effect of reducing a current consumption by deactivating unnecessary Tx and Rx.

When the fingerprint is input, an authentication operation is performed. The authentication compares previously registered image information of the fingerprint with newly input image information of the fingerprint. A determination as to whether the images are matched is performed based on a characteristics point and a pattern of the fingerprint. When a match score satisfies a reference condition and thus the authentication is passed, a fingerprint authentication success is determined.

When the authentication is passed, an operation is performed suitably for a scenario previously stored in an executed application or a service.

Figure 15:
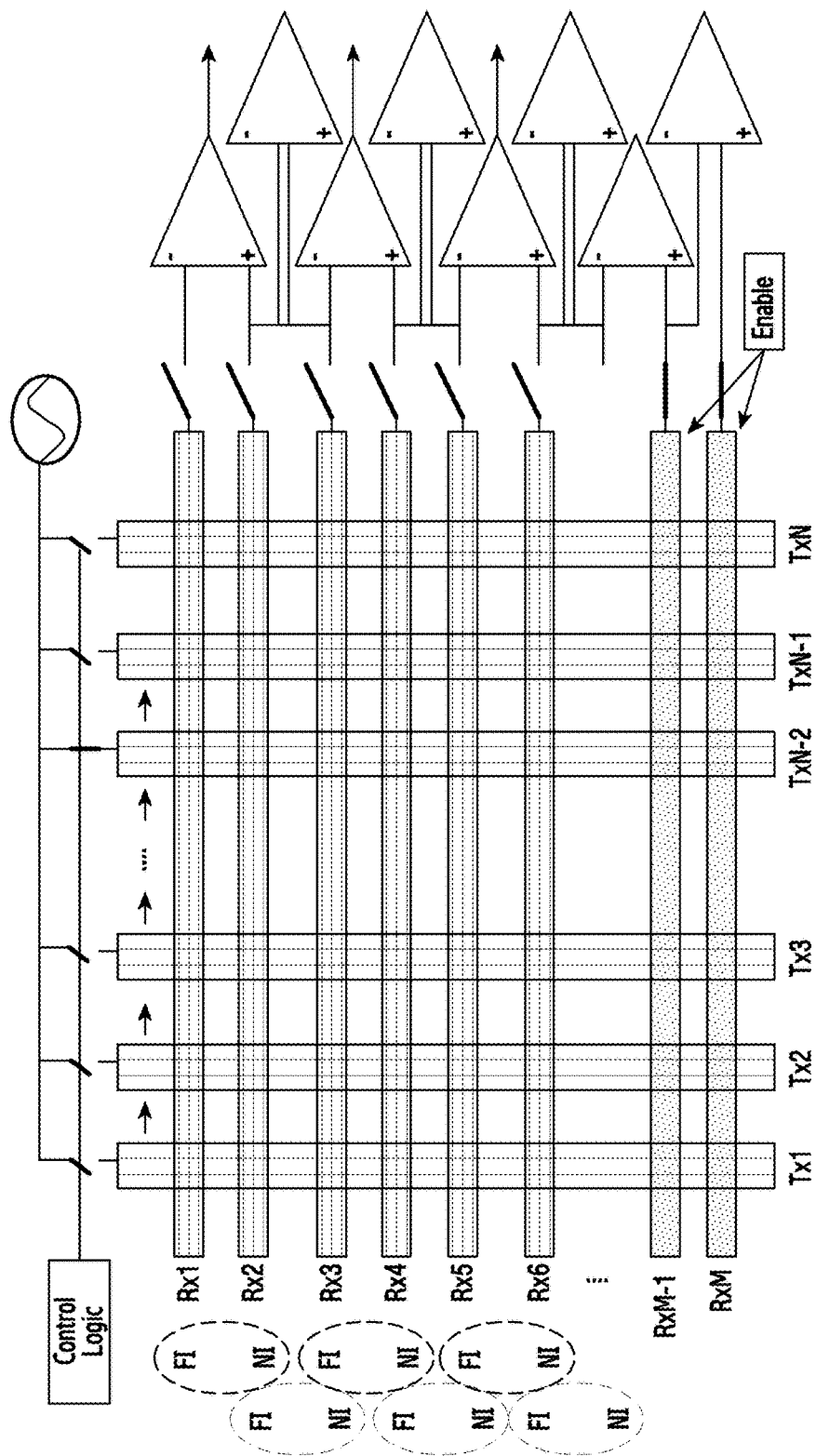
FIG. 15 is a view illustrating electrode lines of a 1D fingerprint sensor, according to an embodiment of the present disclosure.
Figure 16:
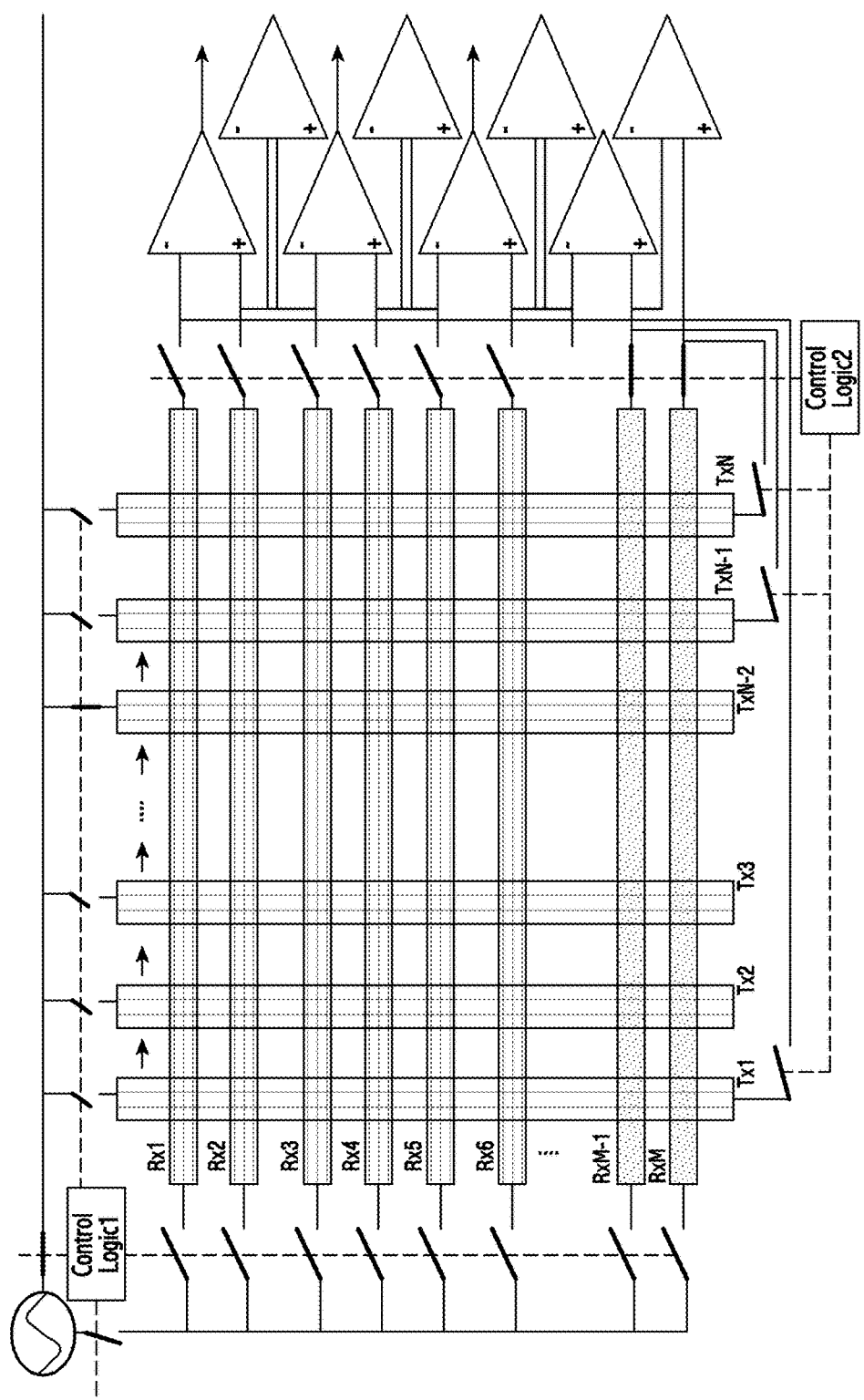
FIG. 16 is a view illustrating a switching operation of an input direction of a 1D fingerprint sensor, according to an embodiment of the present disclosure.

FIG. 15 is a view illustrating electrode lines of a 1D fingerprint sensor, according to an embodiment of the present disclosure. FIG. 16 is a view illustrating a switching operation of an input direction of a 1D fingerprint sensor, according to an embodiment of the present disclosure. FIGS. 17A to 17C illustrate a recognition direction for a fingerprint recognition on a curved display, according to an embodiment of the present disclosure.

Referring to FIGS. 15 to 17, the fingerprint sensor performs the fingerprint recognition in the 1D or 2D method according to methods of controlling and recognizing Tx and Rx.

The 1D method is a method of reading the fingerprint in a line, and the 2D method is a method of reading the fingerprint in an area. Since fingerprint information is information of two or more dimensions, the 1D method converts the fingerprint into a 2D by moving a finger in a swipe operation. Thus, the 1D method is also referred to as a swipe type.

The 2D method may be referred to as a touch type or an area type.

Both of the 1D method and the 2D method have advantages and faults, and thus it may not be determined that one method is superior to another method. However, a usability of a touch type is better than that of another type. However, in the case of the touch type, there are limits of a device and a mounting space. In addition, from a point of a view of fingerprint registration, a swipe method recognizes a fingerprint at once. However, in the case of the touch method, several touches may be required. Each method has advantages and faults according to situations. Therefore, if the fingerprint sensor of the 2D method is used in the 1D method according to a situation, this may have great advantages.

In electronic device 101, the a 1D or 2D mode may be switched by identifying a use state of a user and a condition. For example, when a display is flexible or curved, it may be difficult to authenticate the fingerprint by a touch. This is because a fingerprint input may be distorted since an input unit is curved. Therefore, in such a case, when a mode is changed to the 1D mode to allow a swipe, an accurate fingerprint may be input.

In addition, the touch method has advantages in the usability, but has faults in which a vestige of the fingerprint may remain on a surface of the display. Since fingerprint information is extremely personal information and thus may cause critical damage when the fingerprint information is leaked, the fingerprint information should not be copied. Accordingly, when a method of the fingerprint sensor is changed into the swipe method, the problem of the remaining fingerprint spot may be resolved.

As described above, the fingerprint sensor mode may be changed from the 2D mode to the 1D mode, or may be changed from the 1D mode to the 2D mode, due to a curve of the display in the electronic device 101 and a user setting.

The fingerprint sensor of the 2D mode captures the fingerprint using all Tx lines and Rx lines.

In an operation sequence in various embodiments, Rx1 and Rx2 are enabled, Rx1 is set as a Finger Information (FI) and Rx2 is set as a Noise Information (NI), Tx1 to TxN are sequentially turned on, Rx2 and Rx3 are enabled, Rx2 is set as the FI, Rx3 is set as the NI, and Tx1 to TxN are sequentially turned on.

Referring to FIG. 15, the 1D mode enables only a pair of FI and NI, among a total of M Rx. In addition, the Tx continuously and sequentially turns on and turns off until a finger swipe ends.

For example, Tx1 to TxN are sequentially turned on and turned off, and again Tx1 to TxN are sequentially turned on and turned off. A corresponding principle is the same as that of the touch method.

In a case in which the fingerprint sensor of the 1D type recognizing the fingerprint in the swipe method is used, when a direction of a device is changed, the fingerprint input also should be changed. To this end, in the case of the fingerprint recognition, a direction of the swipe may be changed.

In FIG. 16, a switch is added to each of Tx and Rx lines. When a swipe is operated in a vertical direction in the drawing, it may be performed in the existing method. When the swipe is operated in a horizontal direction, switches for each of the existing Tx and Rx lines are opened. A differential amplifier of the Rx and a switch are closed in the Tx line. The Rx line is connected to a Tx source by turning on a switch. Thus, the Tx and the Rx are exchanged. That is, a role of the Tx and a role of the Rx are exchanged using the switch to perform a fingerprint input.

In FIGS. 17A to 17C, when the fingerprint sensor recognizes a finger of a person, it is important to generate a shape of the fingerprint without a distortion. Therefore, it is important to uniformly read a value when an Rx is contacted with a finger. When a display is curved, an area of the finger touching a screen is curved, and thus the shape of the fingerprint may be distorted. This may be an element reducing a recognition rate in the fingerprint sensor of which an accuracy is the most important. Thus, when the display is curved, it should be controlled such that a hand may touch a straight line area to perform the fingerprint recognition.

In FIGS. 17A and 17B, a flexible display senses a curved direction and determines a recognition direction of a fingerprint sensor based on the sensed direction. When a curved axis is identified in a pattern of an X axis and a Y axis, a Tx and an Rx may be exchanged through a switch connecting the Tx and the Rx.

When a display is curved in the X axis, as shown in FIG. 17A, since a 2D fingerprint recognition cannot be performed, the Rx remains in a vertical direction and a swipe may be performed in a direction from left to right or a direction from right to left to recognize a fingerprint. In the same manner, when the display is curved in the Y axis, as shown in FIG. 17B, the swipe may be performed in a direction from an upper side to a lower side or a direction from the lower side to the upper side. That is, the Rx, which may be distorted in a state in which an input panel is curved, is controlled to be minimized and an accurate image may be generated by a swipe of a user.

Figure 18:
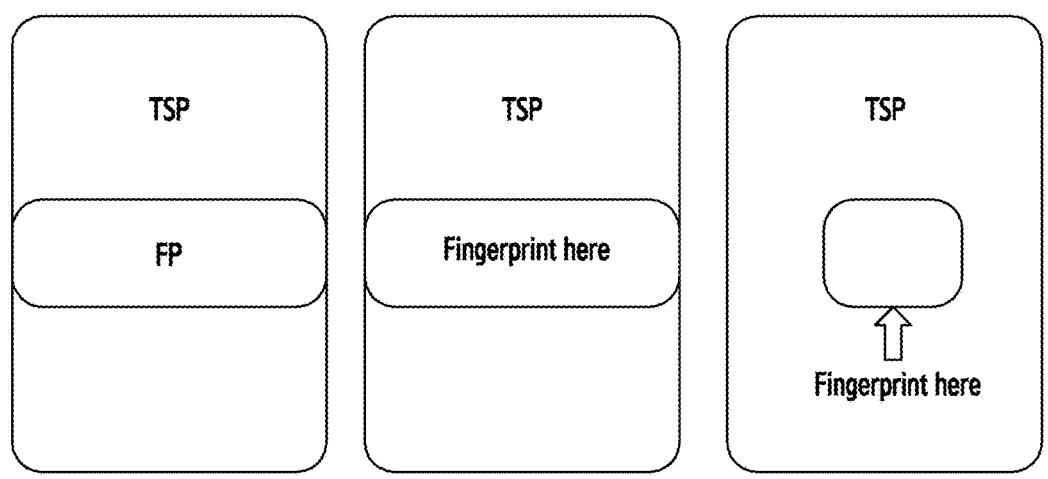
FIG. 18 illustrates a screen of an electronic device in which a fingerprint input mode is displayed, according to an embodiment of the present disclosure.

FIG. 18 illustrates a screen of an electronic device in which a fingerprint input mode is displayed, according to an embodiment of the present disclosure.

Referring to FIG. 18, a fingerprint input GUI disposition is displayed on a screen of the electronic device 101, based on a physical position of an FP. A fingerprint input module reads predetermined FP area information and displays a fingerprint input UI in a position where a fingerprint input is possible on a display. When the FP overlaps a central area of the TSP, a fingerprint input may be induced. The fingerprint input area is an area where the FP is possible.

When the FP is driven, the TSP of the overlapped area is controlled. For example, when the FP is driven, an operation of the TSP of the overlapped area is turned off, and thus an interference error of a fingerprint recognition and a touch recognition is prevented.

The TSP may also be controlled to promptly activate and turn off the FP after the fingerprint recognition is finished, to enable a user to feel that a fingerprint input and a touch input are naturally operated without a disconnection.

Figure 19:
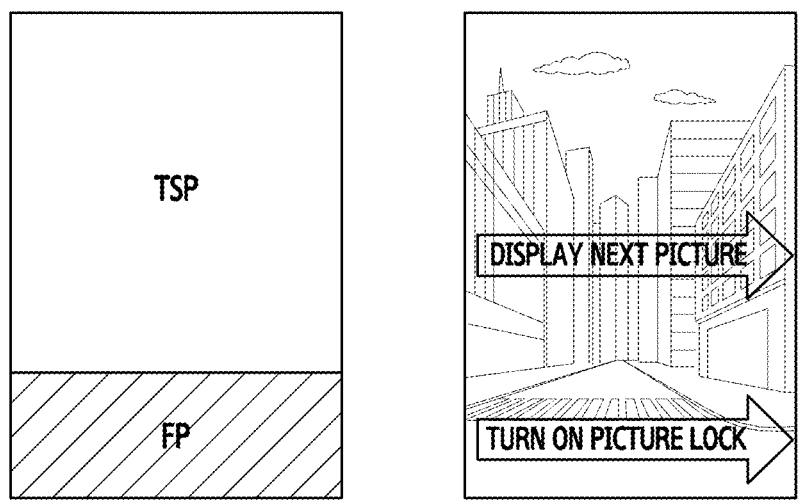
FIG. 19 illustrates a drag after a touch operation on a screen of an electronic device, according to an embodiment of the present disclosure.

FIG. 19 illustrates a drag after a touch operation on a screen of an electronic device, according to an embodiment of the present disclosure.

Referring to FIG. 19, in relation to a drag during a touch and drag operation, a drag started after a fingerprint recognition is finished in an FP area is linked to a security operation; while a drag in a TSP area where the FP and the TSP do not overlap is linked to a different operation. For example, in a case of a gallery application, when a drag without an FP overlap is performed, a next (or a previous) picture is displayed. A drag started after a fingerprint recognition in an FP area may be linked to the security operation such as turning on and off a lock of a corresponding picture.

For another example, in a lock screen, if a swipe is performed in a normal area, it may enter a normal mode, and if the swipe is performed in an area of the FP, it may enter the security mode.

Figure 20:
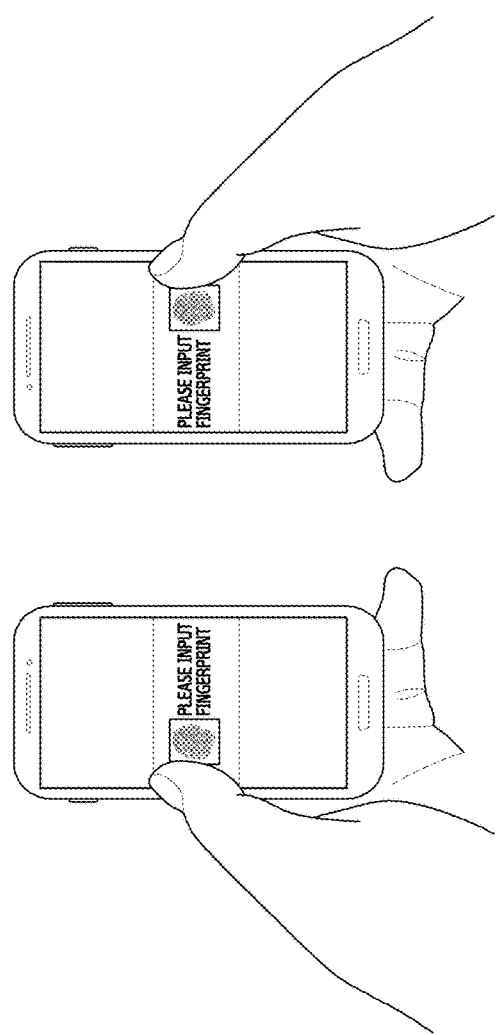
FIG. 20 illustrates a screen of an electronic device in which a fingerprint input finger position is sensed and a position of a fingerprint input window is changed, according to an embodiment of the present disclosure.

FIG. 20 illustrates a screen of an electronic device in which a fingerprint input finger position is sensed and a position of a fingerprint input window is changed, according to an embodiment of the present disclosure.

Referring to FIG. 20, a fingerprint sensor is designed in a position where a fingerprint recognition is performed in the most comfortable position when a user's hand grips a device. For example, an FP may be designed in a central area to which a finger may be touched after gripping a device with the hand A position of a primarily used finger may be determined based on this. An area where the user often performs the fingerprint input may be determined, and a fingerprint input window may be displayed in a left area, a right area, a central area, or an area designated by the user. Alternatively, the position of the fingerprint input window may be determined using finger information having a registered finger.

When the hand input by the user is determined as a left hand or a right hand, a UI such as a camera photographing button, a menu configuration, a telephone/message transmission button, a frequently used menu and a game controller may be configured based on this information such that a frequently used hand is comfortable.

When the position of the fingerprint input window is determined, numbers of Tx and Rx lines of an FP corresponding to the GUI form the fingerprint input window. Therefore, in the fingerprint mode, only Tx and Rx lines corresponding to the area are activated, and remaining Tx and Rx of the FP are deactivated.

Figure 21:
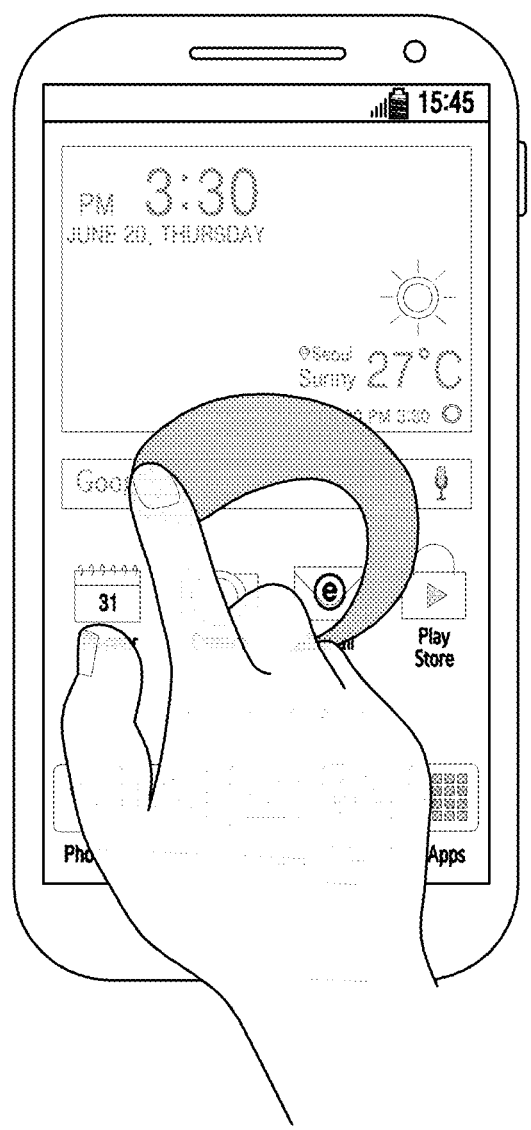
FIG. 21 illustrates an operation of a swipe for preventing a fingerprint vestige in a screen of an electronic device, according an embodiment of the present disclosure.

FIG. 21 illustrates an operation of a swipe for preventing a fingerprint vestige in a screen of an electronic device, according an embodiment of the present disclosure.

Referring to FIG. 21, in a conventional fingerprint recognition of a touch method, a fingerprint is left on a glass of a smart phone surface, and therefore the fingerprint may be copied and used. A method to prevent leaving a fingerprint on the glass is through a swipe.

Accordingly, after a fingerprint authentication, a user may be guided to trace with a finger on a screen of the electronic device 101, a snail shape of which the thickness is gradually thinned; such a gesture enables the user to perform authentication.

After an additional authentication, a pattern for removing the fingerprint is provided to the user as an additional element of a security. For example, after the fingerprint authentication is performed, and a star, a quadrangle, a triangle or a circle is determined randomly to be used in a final authentication. A corresponding pattern recognition is sensed by a TSP touch.

When a flexible display is flat, a touch type fingerprint UI is displayed. When the flexible display is curved, a UI may be displayed so as to perform a swipe in a curved direction.

Since a direction perpendicular to a curved direction when the flexible display is curved is an Rx, a Tx and the Rx may be switched according to horizontal and vertical modes. For example, when the flexible display is curved in an X axis, it may allow a swipe from an upper side to a lower side. When the flexible display is curved in a Y axis, it may allow a swipe from left to right. In a case of a touch method, when a touch is weak, the touch may not be recognized at once. Therefore, the fingerprint recognition using the swipe method may be used.

A swipe direction convenient for a user may be different according to a direction in which the electronic device 101 is held. Therefore, the swipe direction may be controlled according to the direction of the electronic device 101, and this is possible through a switching of the Tx and the Rx of the fingerprint sensor.

Figure 22:
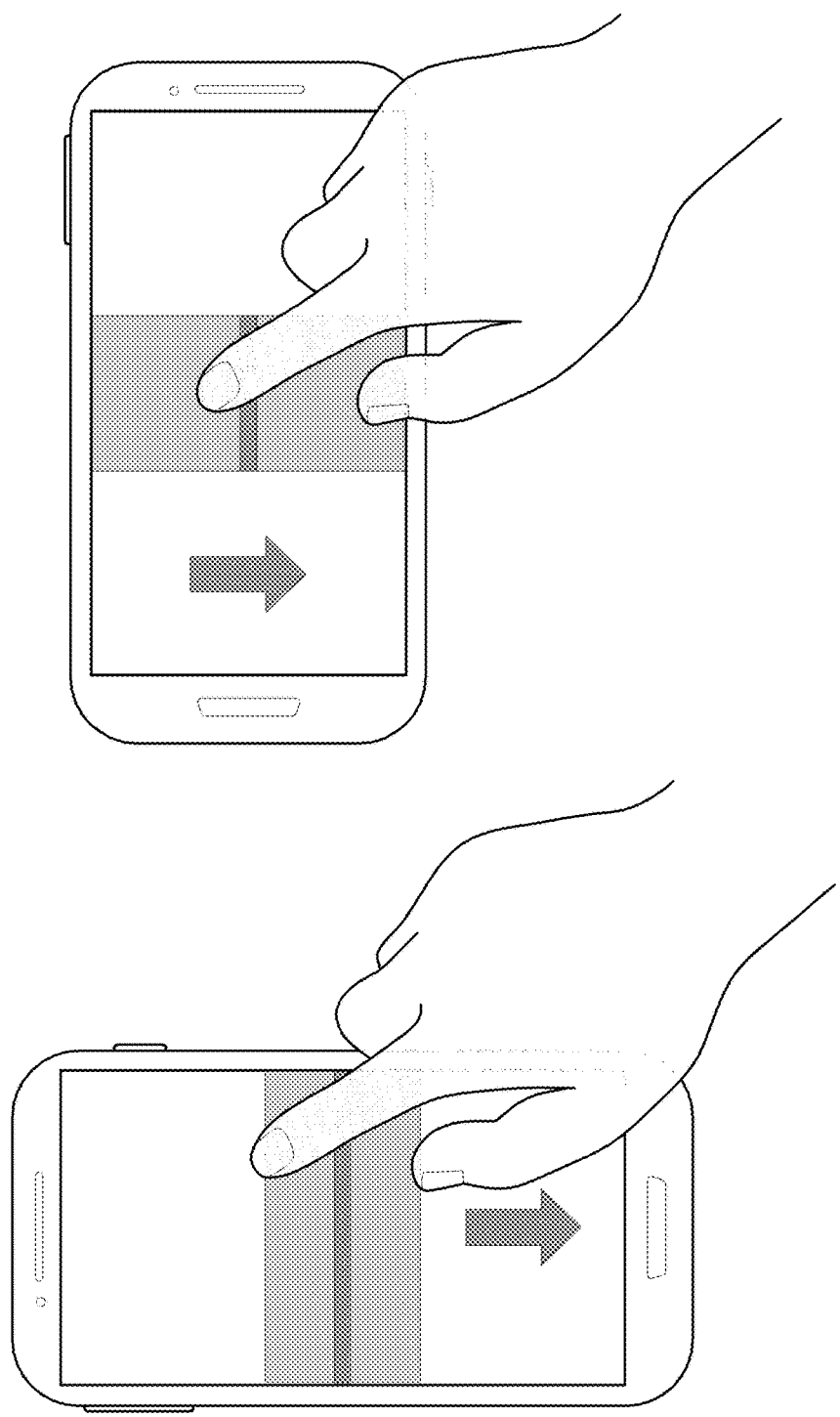
FIG. 22 illustrates a screen of an electronic device in which a fingerprint input position is changed, according to an embodiment of the present disclosure.

FIG. 22 illustrates a screen of an electronic device in which a fingerprint input position is changed, according to an embodiment of the present disclosure.

Referring to FIG. 22, when the electronic device 101 is disposed in a vertical direction, a swipe is performed in a direction from an upper side to a lower side of the electronic device 101. In this case, an Rx is in a horizontal direction. In contrast, when the electronic device 101 is disposed in a horizontal direction, the swipe is performed in a direction from left to right of the electronic device 101. In this case, the Rx is in the vertical direction when the electronic device 101 stands straight. Thus, a UI may be displayed such that the swipe direction may be changed according to the direction of the electronic device 101, and thus directions of a Tx and an Rx may be switched.

Figure 23:
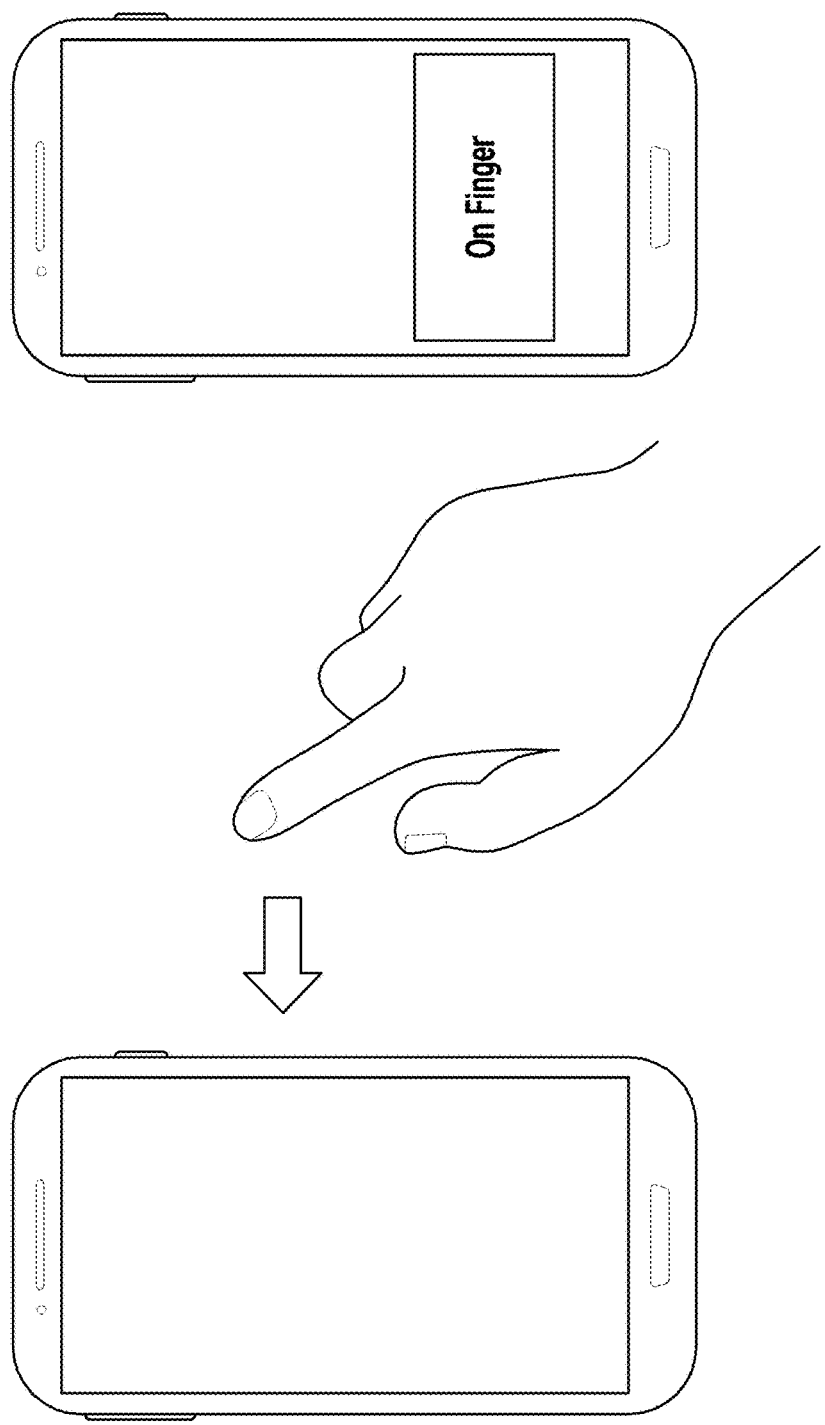
FIG. 23 illustrates a screen of an electronic device in which a fingerprint position is indicated according to an approach of a finger to the electronic device, according to an embodiment of the present disclosure.

FIG. 23 illustrates a screen of an electronic device in which a fingerprint position is indicated according to an approach of a finger to the electronic device, according to an embodiment of the present disclosure.

Referring to FIG. 23, a user's hand approaches a display of an electronic device 101 in a state in which the display of the electronic device 101 is turned off. The electronic device 101 is operated in low power because a TSP uses an SP. The TSP senses a proximity through a hovering of the user.

When the electronic device 101 senses a proximity or a touch, the electronic device 101 displays, in a UI, a position where a fingerprint input is possible in an area where an FP is positioned. In order to display the position on the display, the AP wakes up momentarily. Therefore, the position is shown for a moment and the blinks. Alternatively, the position may be displayed in a low screen brightness, a gray screen, or the like for a minimum current consumption. In addition, an FP connected to the SP is activated and a user is easily able to recognize a fingerprint. When the fingerprint is authenticated, a touch screen may be unlocked.

Figure 24:
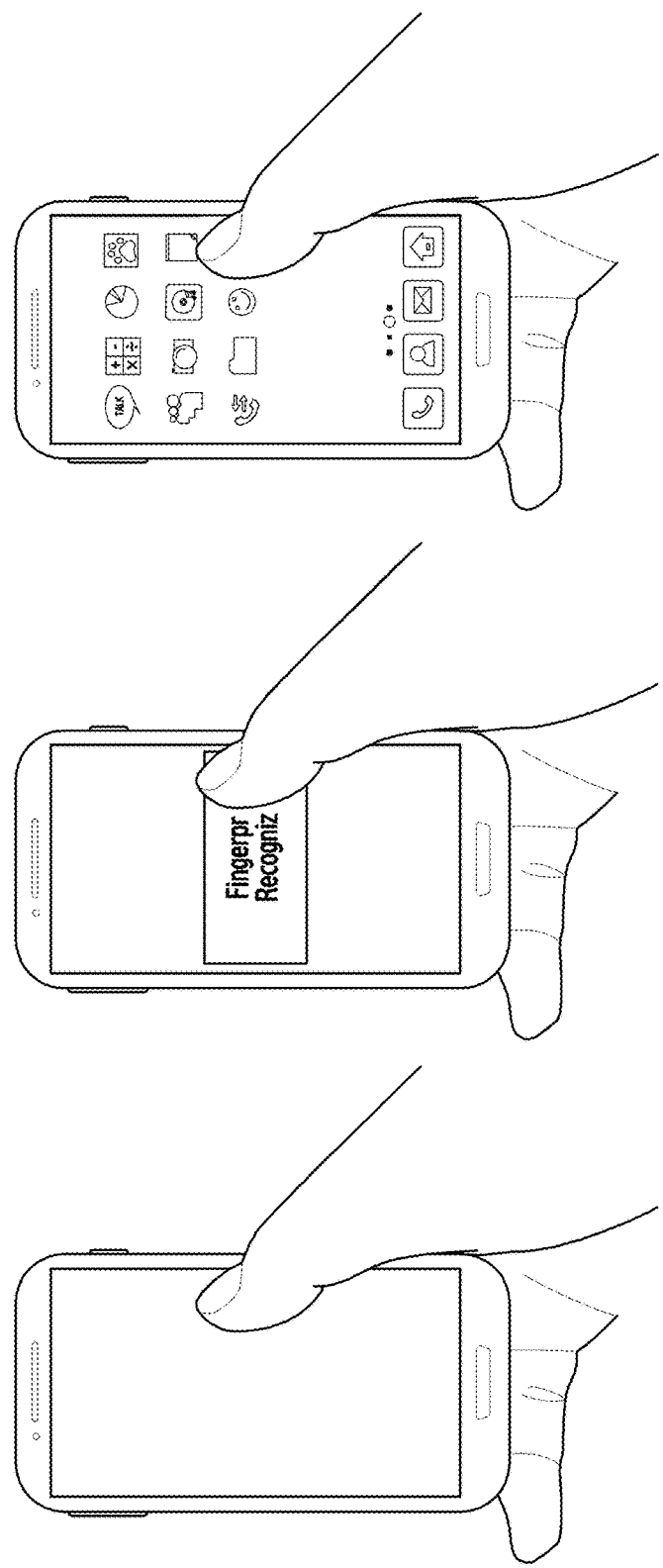
FIG. 24 illustrates a screen of an electronic device in which a screen unlock is performed using a fingerprint input, according to an embodiment of the present disclosure.

FIG. 24 illustrates a screen of an electronic device in which a screen unlock is performed using a fingerprint input, according to an embodiment of the present disclosure.

Referring to FIG. 24, when a TSP connected to an SP senses a touch of a user, if the user knows that a touch touches a position where an FP is disposed, the FP is promptly driven to recognize a fingerprint, and when the recognized fingerprint is matched with a designated fingerprint, an unlock screen may be performed.

Figure 25:
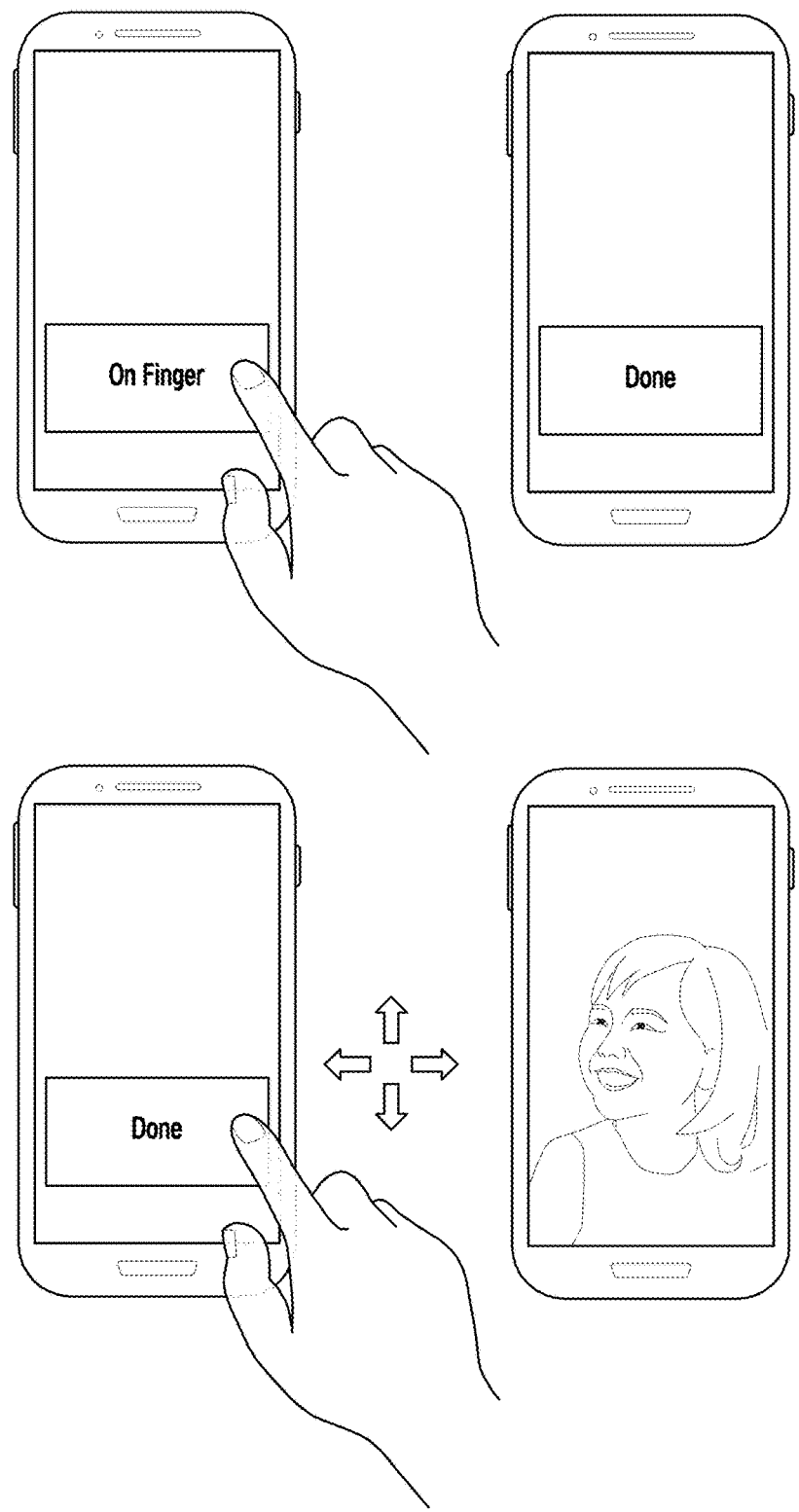
FIG. 25 is illustrates an electronic device in which a front camera function is executed through a shortened input after a fingerprint input, according to an embodiment of the present disclosure.

FIG. 25 is illustrates an electronic device in which a front camera function is executed through a shortened input after a fingerprint input, according to an embodiment of the present disclosure.

Referring to FIG. 25, a fingerprint recognition is finished in an FP displayed in a UI of the electronic device 101, and a swipe is performed in a desired direction among up, down, left and right directions.

An unlock function and an app designated by a user in advance are simultaneously executed according to an angle (e.g., a horizontal direction and a vertical direction) of the electronic device 101 and a swipe direction. For example, as shown in a fourth drawing of FIG. 25, the unlock function and a selfie camera function (i.e., the front camera) is simultaneously executed according to a swipe direction previously designated in a vertical state.

Figure 26:
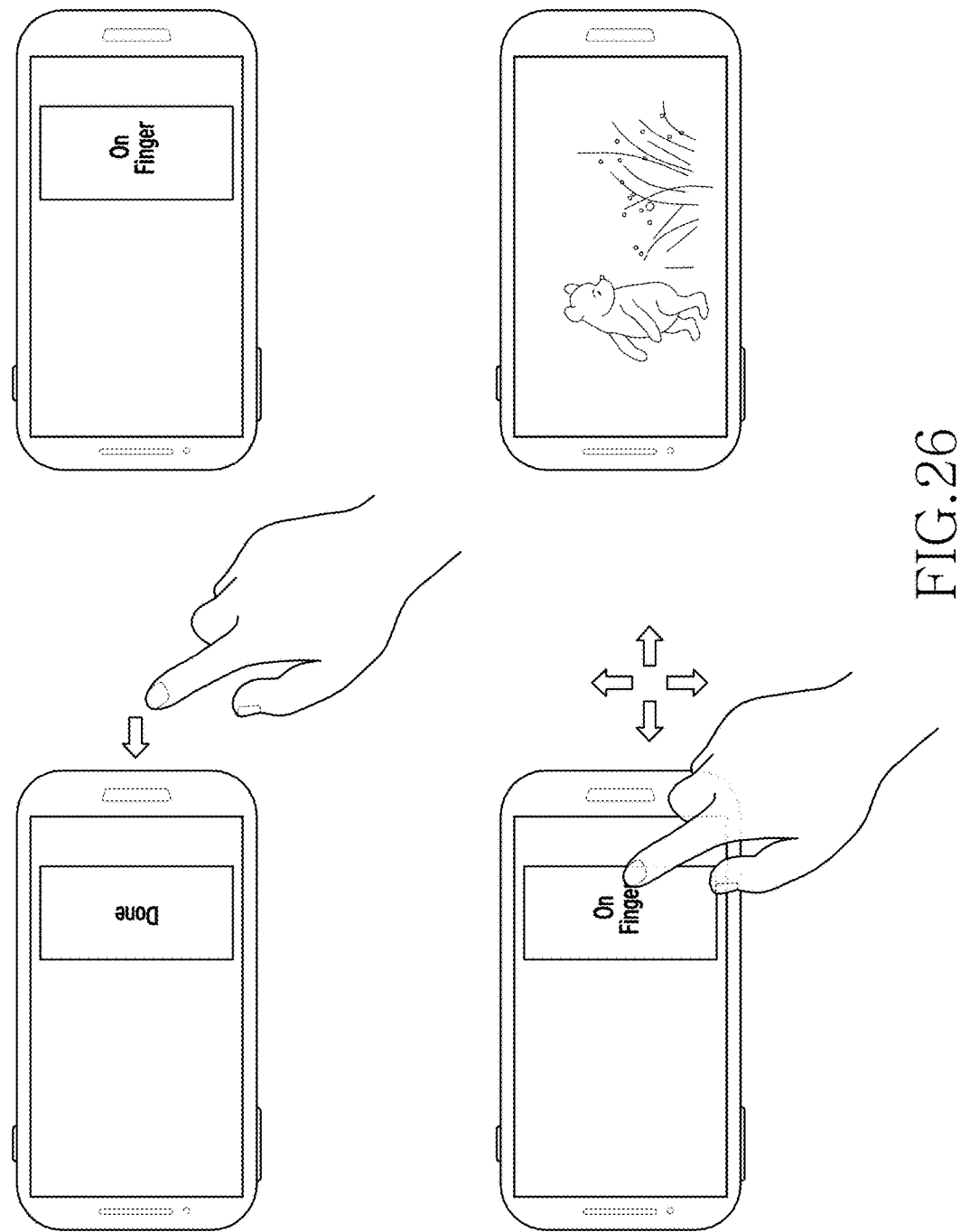
FIG. 26 illustrates an electronic device in which a rear camera function is executed through a shortened input after a fingerprint input, according to an embodiment of the present disclosure.

FIG. 26 illustrates an electronic device in which a rear camera function is executed through a shortened input after a fingerprint input, according to an embodiment of the present disclosure.

Referring to FIG. 26, after an FP authentication operation, as described above, when a swipe is performed in a state in which the electronic device 101 is in positioned in an upside down state, as shown in a fourth drawing of FIG. 26, the rear camera function is executed.

Figure 27:
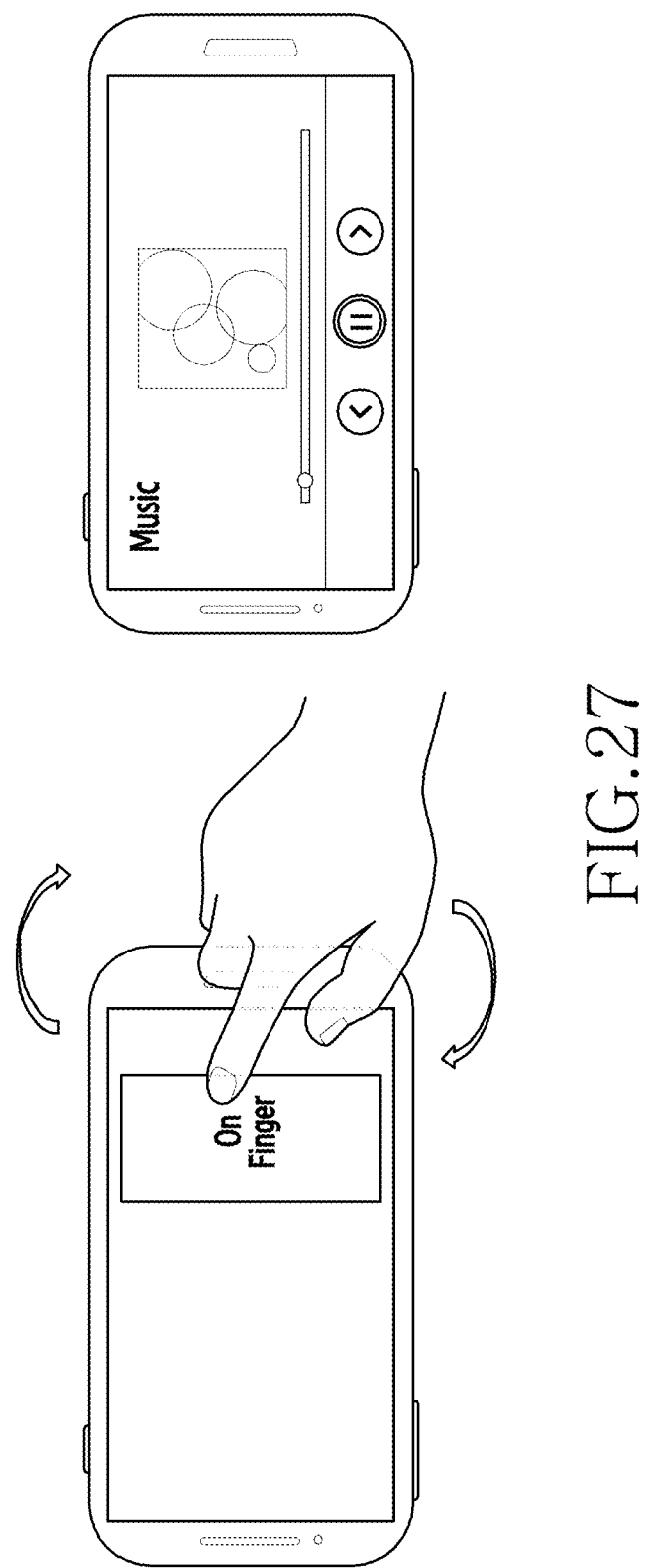
FIG. 27 illustrates an electronic device in which a music playing function is executed through a motion input after a fingerprint input, according to an embodiment of the present disclosure.

FIG. 27 illustrates an electronic device in which a music playing function is executed through a motion input after a fingerprint input, according to an embodiment of the present disclosure.

Referring to FIG. 27, after an FP authentication step, when a predetermined motion operation (e.g., shaking two or three times in front and back directions) is performed, an unlock function and a predetermined music player is simultaneously executed.

Figure 28:
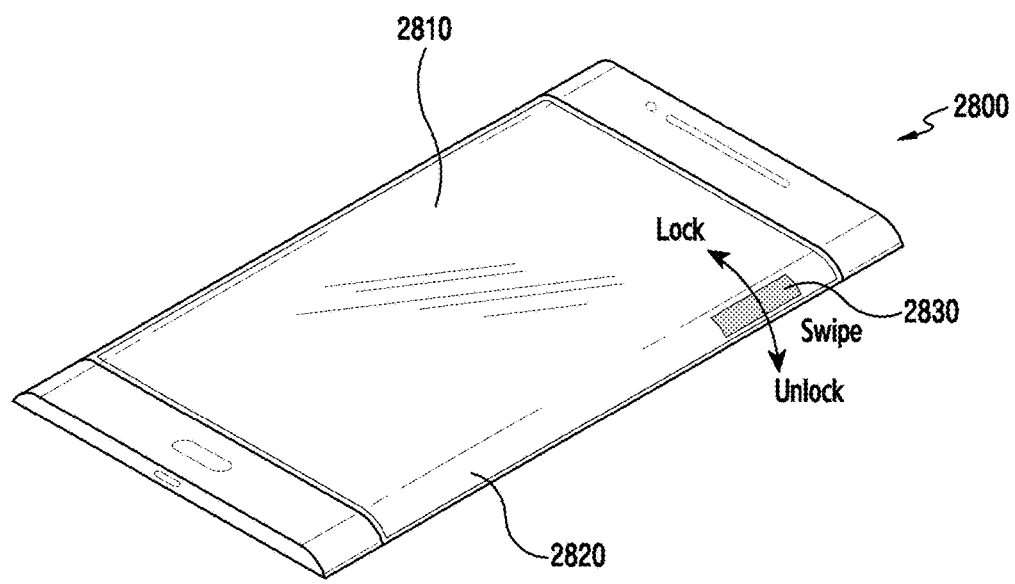
FIG. 28 illustrates an electronic device in which an FP is disposed to be used in a second display of the electronic device, according to an embodiment of the present disclosure.

FIG. 28 illustrates an electronic device in which an FP is disposed to be used in a second display of the electronic device, according to an embodiment of the present disclosure.

Referring to FIG. 28, an electronic device 2800 includes a first display 2810 and a second display 2820 in a front of the electronic device 2800. The second display 2820 is disposed along a side of the first display 2810. The first display 2810 is a flat display and the second display 2820 is a curved display. However, the first display 2810 and the second display 2820 may be formed in either a flat type or a curved type. The second display 2820 may be formed to have a curvature or not to have a curvature. In addition, the first display 2810 or the second display 2820 may be formed of a hard or soft display.

In the electronic device 2800, when an FP 2830 is mounted on the second display 2820 and a swipe is performed in up and down directions to recognize a fingerprint, a lock function, and an unlock function of the first display 2810 and second display 2820 may be operated. For example, when the swipe is performed in the up direction, a lock state may be entered, and when the swipe is performed in the down direction, an unlock state may be entered. Even in a state in which an AP is asleep, a fingerprint sensor may be connected to an SP to recognize the fingerprint in low power and thus a screen may be unlocked.

In an area where the second display 2820 is disposed, the FP 2830 is formed on at least a portion of the second display 2820, and thus a current consumption may be minimized.

When the electronic device 2800 is gripped by a hand of a user (in the case of a right-handed person), the FP 2830 is positioned such that the swipe is performed easily using a thumb. Therefore, usability is not degraded and only a comfortable position according to the user may be set. A fingerprint verifier portion of the FP 2830 is displayed on the second display 2820 to enable the user to know a fingerprint recognition area. The fingerprint verifier may be set at different positions according to the user.

Figure 29:
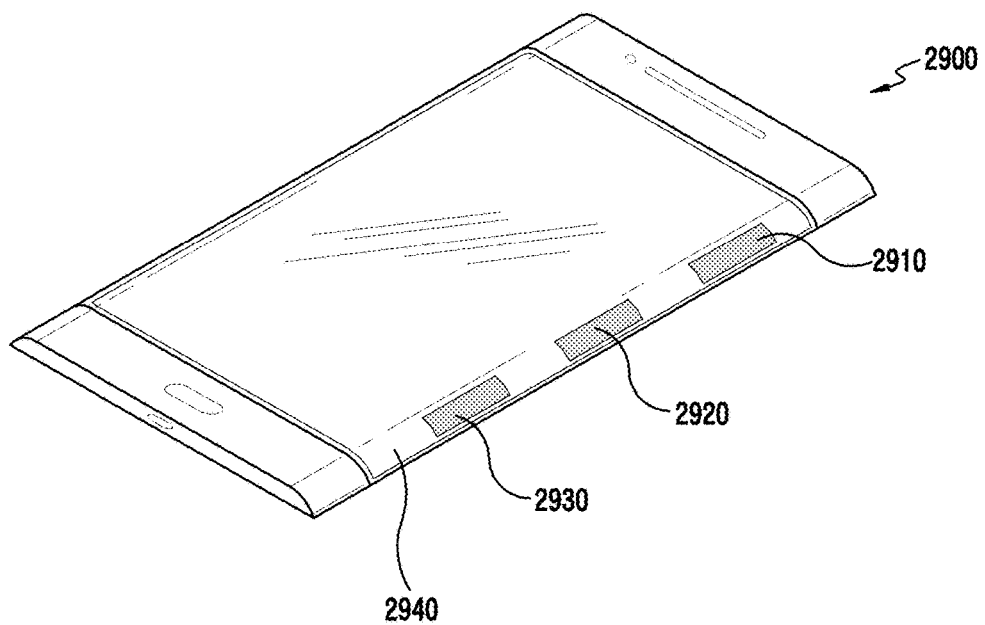
FIG. 29 illustrates an electronic device in which a plurality of FPs are disposed in a second display of the electronic device, according to an embodiment of the present disclosure.

FIG. 29 illustrates an electronic device in which a plurality of FPs are disposed in a second display of the electronic device, according to an embodiment of the present disclosure.

Referring to FIG. 29, in an area of the second display 2940 of the electronic device 2900, a plurality of FPs 2910, 2920 and 2930 are disposed. Therefore, a user performs a fingerprint recognition in the most comfortable area by a user setting. Power is blocked to an FP which is not used by the user and thus a current consumption may be minimized.

Figure 30:
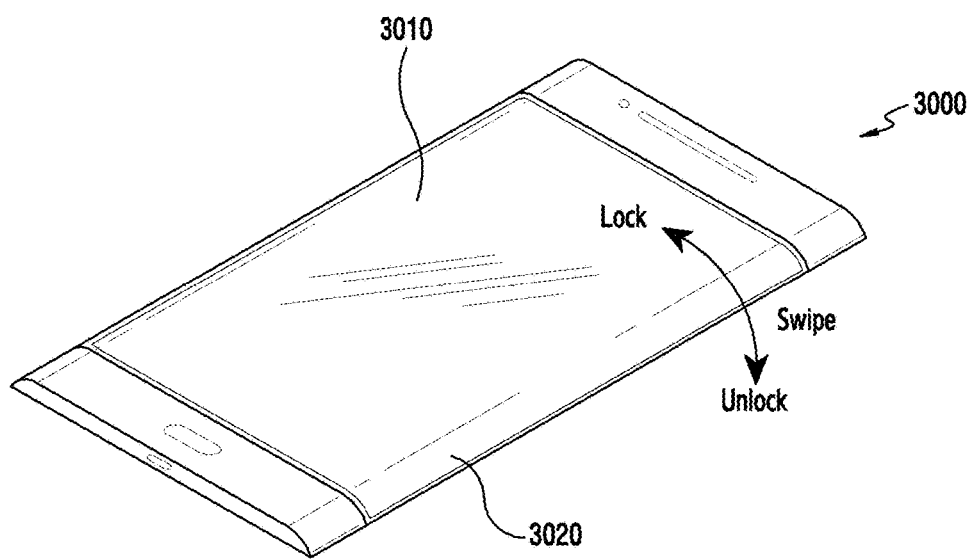
FIG. 30 illustrates an electronic device in which a first display includes a TSP and a second display includes an FP, according to an embodiment of the present disclosure.

FIG. 30 illustrates an electronic device in which a first display includes a TSP and a second display includes an FP, according to an embodiment of the present disclosure.

Referring to FIG. 30, an electronic device 3000 includes a flat first display 3010 which uses the TSP and the second display 3020 having a curvature which uses the FP. The electronic device 3000 reduces a current consumption and minimizes an interference of touch and fingerprint recognitions compared to a case in which the FP is used in a whole display. In addition, a user may be guided such that the user may intuitively perform an input corresponding to a display through a usability division according to a screen division between the first display 3010 and the second display 3020.

Figure 31:
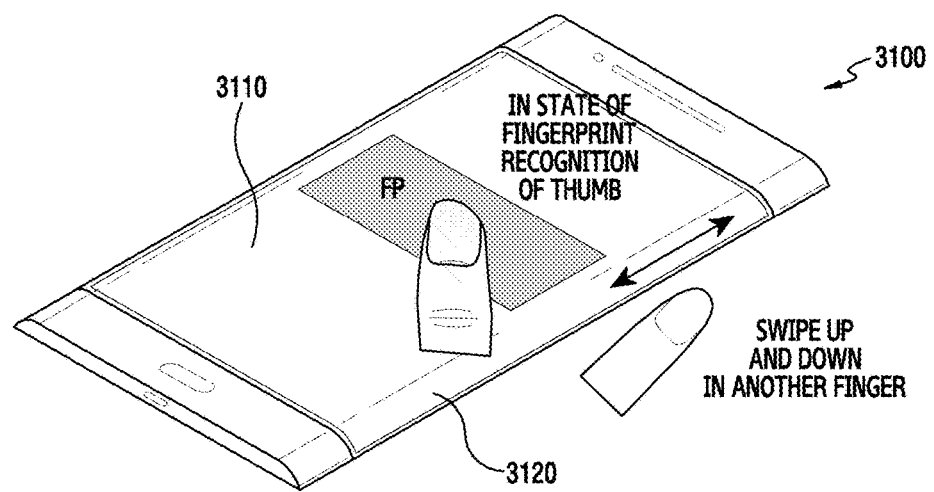
FIG. 31 illustrates a method of utilizing a fingerprint recognition to control a function of an electronic device, according to an embodiment of the present disclosure.

FIG. 31 illustrates a method of utilizing a fingerprint recognition to control a function of an electronic device, according to an embodiment.

Referring to FIG. 31, when a swipe using a first finger is performed in a second display 3120 of an electronic device 3100 while a fingerprint of a second finger is recognized in an FP disposed in a first display 3110 in an AP sleep state, the electronic device 3120 performs an additional operation such as volume up and down. This gesture enables the electronic device 3100 to simply and additionally set and control a function of the electronic device 3100. This may enable the electronic device 3100 to execute a specific application simply, although the device does not perform the application after a unlock state. In addition, this may prevent a thoughtless setting of another user.

Figure 32:
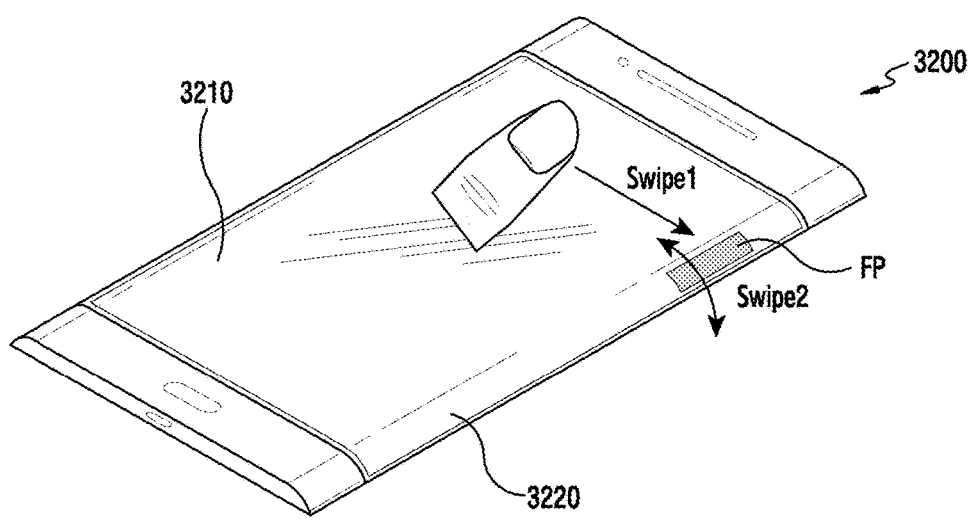
FIG. 32 illustrates a method of utilizing a fingerprint recognition operation in a home screen, according to an embodiment of the present disclosure.

FIG. 32 illustrates a method of utilizing a fingerprint recognition operation in a home screen, according to an embodiment of the present disclosure.

Referring to FIG. 32, an electronic device 3200 may strengthen a privacy function using fingerprint recognition by providing a secret page, when a second swipe of an FP disposed at a second display 3220 is performed immediately after a first swipe of a TSP disposed at a first display 3210 is performed in a direction of the FP, such that the first swipe and the second swipe are performed in succession. This provides a simple usability by complexly applying a normal unlock scenario and a private unlock scenario.

Figure 33:
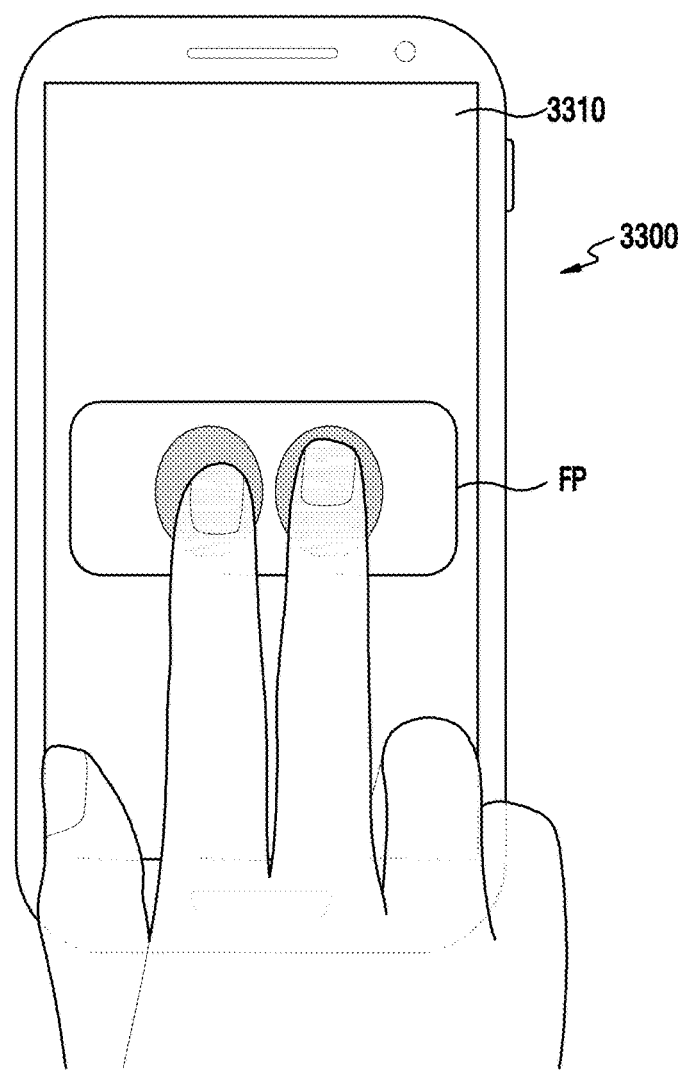
FIG. 33 illustrates a screen of an electronic device in which a fingerprint recognition is performed through a multi-touch, according to an embodiment of the present disclosure.

FIG. 33 illustrates a screen of an electronic device in which a fingerprint recognition is performed through a multi-touch, according to an embodiment of the present disclosure.

Referring to FIG. 33, when two fingers of a user approach an electronic device 3300 of which a display 3310 is in an off state and the two fingers are simultaneously put on an FP, the fingerprint of each finger is read using adjacent Tx and Rx of the FP to receive data.

An equality level between the recognized fingerprint and a fingerprint of a registered user is determined. Although an equality rate of one finger is insufficient, an equality rate of another finger is calculated to process a personal authentication, and thus accuracy may be further increased.

In addition, an authentication operation may be performed by putting one or more fingers on a panel after registering a plurality of fingers when electronic device 3310 is in a sleep state.

The finger which is put on the panel is recognized, and an operation (e.g., an operation designated by a business operator or a user) connected to a corresponding finger is performed immediately. For example, when the finger which is put on the panel is recognized as an index finger, a rear camera function may be executed. In addition, when the finger which is put on the panel is recognized as a thumb, music may be played.

Figure 34:
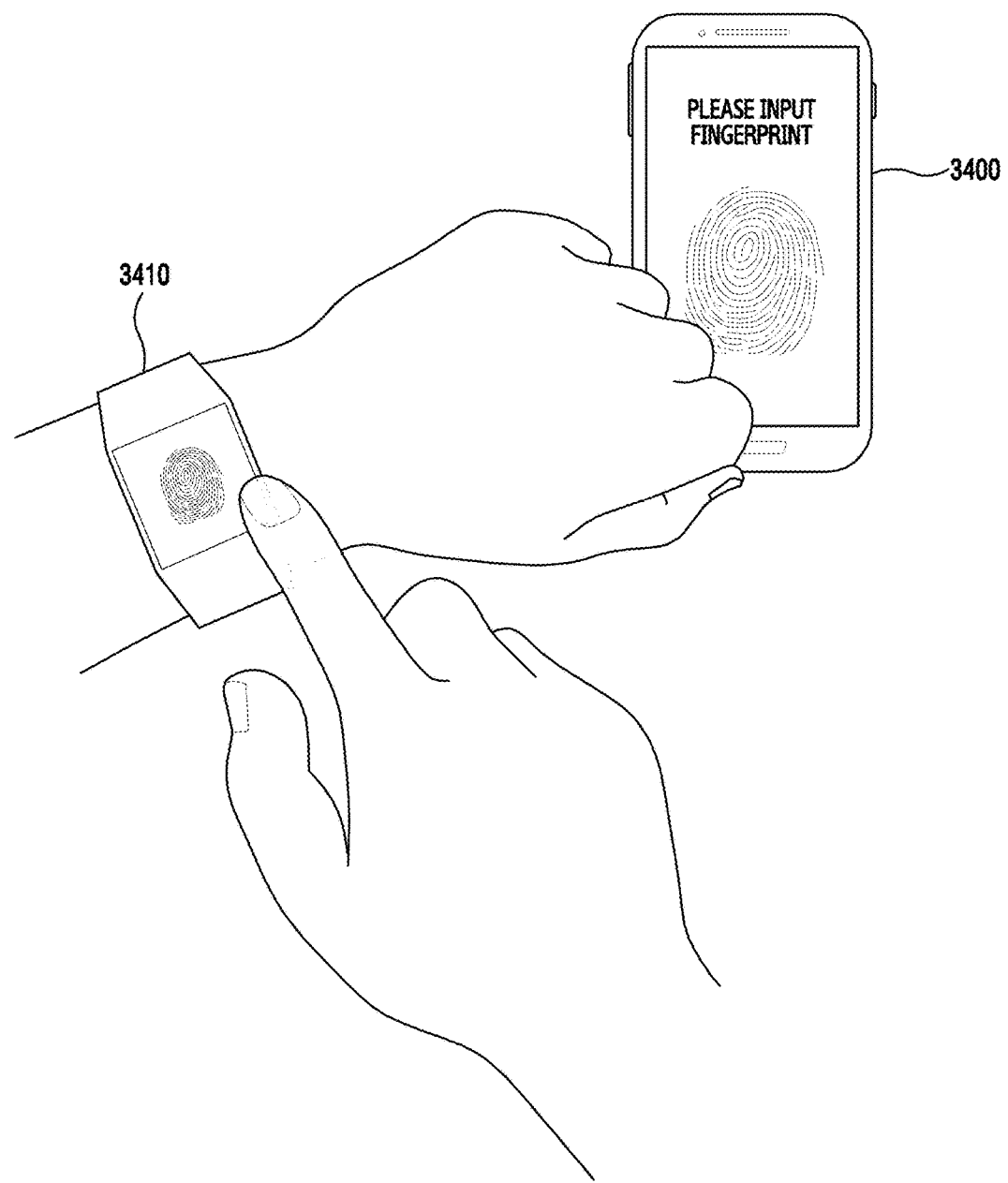
FIG. 34 illustrates a method in which a fingerprint recognition is performed in a wearable device, according to an embodiment of the present disclosure.

FIG. 34 illustrates a method in which a fingerprint recognition is performed in a wearable device, according to an embodiment of the present disclosure.

Referring to FIG. 34, a fingerprint recognition may be performed in a wearable device 3410 of a type worn on a wrist.

The wearable device 3410 is worn on a left wrist. All five fingers of a right hand are registered in the wearable device 3410. When a finger of the right hand is put on an FP, the finger put on the FP is recognized, and thus an operation designated by a user is performed immediately. When a display is a curved type, a fingerprint recognition is performed by swiping in a curved direction. Since a screen size of the wearable device 3410 is smaller than a smart phone, the wearable device 3410 has a screen size limit Therefore, a menu depth movement may be difficult. Thus, when a fingerprint is recognized in a screen of the wearable device 3410, a desired function is performed as a shortcut function, and thus usability is improved.

When the wearable device 3410 is used, a connected smart phone 3400 or a wearable device itself receives a request for the fingerprint input. In addition, when the fingerprint input is requested, the wearable device 3410 executes a fingerprint input mode.

In the fingerprint input mode, an FP performs a switching operation instead of a TSP to recognize a fingerprint. In the fingerprint input mode, the fingerprint of a finger is recognized to recognize the finger of the fingerprint. After a left hand or a right hand is determined according to the recognized finger and a direction of a UI is determined, a screen of the wearable device 3410 or the smart phone 3400 may be awakened. When a use of the fingerprint input mode is finished, a mode may be entered to a normal mode again, the FP may be deactivated, and the TSP may be operated again.

Each of the above-described elements of the electronic device, according to the various embodiments of the present disclosure, may be comprised of one or more components, and the names of the elements may vary according to the kind of the electronic device. The electronic device may include at least one of the above-described elements, and some of the elements may be omitted or an additional element may be further included. In addition, some of the elements of the electronic device may be combined into a single entity, and may perform the same functions as those of the elements before being combined.

It will be appreciated that embodiments of the present disclosure can be realized in the form of hardware, software or a combination of hardware and software.

Any such software may be stored in a computer readable storage medium. The computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present disclosure.

Accordingly, embodiments of the present disclosure provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

Although specific embodiments have been described in the detailed description of the present disclosure, various change and modifications may be made without departing from the spirit and scope of the present disclosure. Therefore, the scope of the present disclosure should not be defined as being limited to the embodiments, but should be defined by the appended claims and their equivalents.

What is claimed is:

1. An electronic device comprising:
    a display;
    a touch recognition sensor pattern for recognizing a touch input on the display;
    a fingerprint recognition sensor pattern for recognizing a fingerprint input on the display; and
    a processor coupled to the display, the touch recognition sensor pattern, and the fingerprint recognition sensor pattern, wherein the processor is configured to:
activate the touch recognition sensor pattern,
display at least one user interface for receiving the fingerprint input on a fingerprint recognition area of the display,
activate at least a portion of the fingerprint recognition sensor pattern, and
selectively deactivate a portion of the touch recognition sensor pattern corresponding to the activated portion of the fingerprint recognition sensor pattern.

2. The electronic device of claim 1, wherein the touch recognition sensor pattern includes a plurality of first electrodes of a first direction and a plurality of second electrodes of a second direction,
the fingerprint recognition sensor pattern includes a plurality of third electrodes of the first direction and a plurality of fourth electrodes of the second direction, and
the processor is configured to activate the plurality of third electrodes and the plurality of fourth electrodes of the at least a portion of the fingerprint recognition sensor pattern and deactivate the portion of the plurality of first electrodes and the plurality of second electrodes of the touch recognition sensor pattern while executing the fingerprint recognition mode.

3. The electronic device of claim 1, wherein the processor is configured to selectively execute at least one of a touch mode and a swipe mode, based on a predetermined condition, when the processor executes the fingerprint recognition mode.

4. The electronic device of claim 2, wherein the processor is configured to selectively execute at least one of a touch mode and a swipe mode, based on a predetermined condition when the processor executes the fingerprint recognition mode,
the processor is configured to simultaneously activate the plurality of third electrodes and the plurality of fourth electrodes when the processor executes the touch mode, and
the processor is configured to sequentially activate one among the plurality of third electrodes and the plurality of fourth electrodes, when the processor executes the swipe mode.

5. The electronic device of claim 3, wherein the processor is configured to provide a user interface (UI) which guides the fingerprint input of a swipe method on the display, when the processor executes the swipe mode.

6. The electronic device of claim 1, wherein the processor is configured to control to recognize a fingerprint in a touch mode, when the display is a flat display and to recognize the fingerprint in a swipe mode, when the display is a curved display.

7. The electronic device of claim 1, wherein the touch recognition sensor pattern and the fingerprint recognition sensor pattern are disposed on different layers or the same layer.

8. The electronic device of claim 1, wherein the processor is configured to determine whether a fingerprint recognition mode is executed based on whether the touch input is detected while the display is turned off, and control the display to display the at least one user interface in response to executing the fingerprint recognition mode, and
wherein the touch input comprises a proximity touch input.

9. The electronic device of claim 1, further comprising:
an auxiliary processor that provides low driving power to the touch recognition sensor pattern and the fingerprint recognition sensor pattern in a state in which the display is turned off,
wherein the auxiliary processor activates the processor when an input detected in the fingerprint recognition area is a registered fingerprint.

10. The electronic device of claim 1, wherein the processor is configured to deactivate another portion of the fingerprint recognition sensor pattern while executing a fingerprint recognition mode.

11. A method of driving an electronic device including a display, a touch recognition sensor pattern, and a fingerprint recognition sensor pattern, the method comprising:
activating the touch recognition sensor pattern,
displaying at least one user interface for receiving a fingerprint input on a fingerprint recognition area of the display,
activating at least a portion of the fingerprint recognition sensor pattern,
selectively deactivating a portion of the touch recognition sensor pattern corresponding to the activated portion of the fingerprint recognition sensor pattern.

12. The method of claim 11, wherein the touch recognition sensor pattern includes a plurality of first electrodes of a first direction and a plurality of second electrodes of a second direction,
the fingerprint recognition sensor pattern includes a plurality of third electrodes of the first direction and a plurality of fourth electrodes of the second direction, and
the plurality of third electrodes and the plurality of fourth electrodes of the at least a portion of the fingerprint recognition sensor pattern are activated and the plurality of first electrodes and the plurality of second electrodes of the portion of the touch recognition sensor pattern are deactivated while executing the fingerprint recognition mode.

13. The method of claim 11, wherein at least one of a touch mode and a swipe mode is selectively executed, based on a predetermined condition when the fingerprint recognition mode is executed.

14. The method of claim 12, wherein at least one of a touch mode and a swipe mode is selectively executed, based on a predetermined condition, when the fingerprint recognition mode is executed,
the plurality of third electrodes and the plurality of fourth electrodes are simultaneously activated, when the touch mode is executed, and
one among the plurality of third electrodes and the plurality of fourth electrodes is sequentially activated when the swipe mode is executed.

15. The method of claim 14, wherein a user interface (UI) guides a fingerprint input of a swipe method on the display, when the swipe mode is executed.

16. The method of claim 11, further comprising recognizing a fingerprint in a touch mode when the display is a flat display, and recognizing the fingerprint in a swipe mode when the display is a curved display.

17. The method of claim 11, wherein the touch recognition sensor pattern and the fingerprint recognition sensor pattern are disposed on different layers or the same layer.

18. The method of claim 11, wherein receiving the fingerprint input on the fingerprint recognition area of the display comprises receiving a touch input while the display is turned off, and wherein the touch input comprises a proximity touch input.

19. The method of claim 11, further comprising:
providing low driving power to the touch recognition sensor pattern and the fingerprint recognition sensor pattern in a state in which the display is turned off,
activating the electronic device, when an input detected in the fingerprint recognition area is a registered fingerprint.

20. The method of claim 11, further comprising:
deactivating another portion of the fingerprint recognition sensor pattern during a fingerprint recognition mode.

* * * * *